(12) United States Patent
Dudar

(10) Patent No.: US 11,148,930 B2
(45) Date of Patent: Oct. 19, 2021

(54) SYSTEMS AND METHODS FOR FUEL SYSTEM PRESSURE SENSOR RATIONALIZATION

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 103 days.

(21) Appl. No.: 16/148,575

(22) Filed: Oct. 1, 2018

(65) Prior Publication Data

US 2020/0102203 A1   Apr. 2, 2020

(51) Int. Cl.
| | |
|---|---|
| *B67D 7/32* | (2010.01) |
| *F02M 37/00* | (2006.01) |
| *F02M 25/08* | (2006.01) |
| *B60K 15/03* | (2006.01) |
| *B60K 6/22* | (2007.10) |
| *B67D 7/36* | (2010.01) |

(52) U.S. Cl.
CPC .............. *B67D 7/3227* (2013.01); *B60K 6/22* (2013.01); *B60K 15/03* (2013.01); *B67D 7/36* (2013.01); *F02M 25/0809* (2013.01); *F02M 25/0818* (2013.01); *F02M 37/007* (2013.01); *F02M 37/0076* (2013.01); *B60K 2015/0319* (2013.01); *B60K 2015/03217* (2013.01); *B60K 2015/03256* (2013.01); *B60Y 2200/92* (2013.01)

(58) Field of Classification Search
None
See application file for complete search history.

(56) References Cited

U.S. PATENT DOCUMENTS

| | | | |
|---|---|---|---|
| 7,225,796 B2 | 6/2007 | Reddy et al. |
| 8,342,157 B2 | 1/2013 | Der Manuelian et al. |
| 8,353,273 B2 | 1/2013 | Mc Lain et al. |
| 8,560,158 B2 | 10/2013 | Wang et al. |
| 9,217,397 B2 | 12/2015 | Peters et al. |
| 9,759,166 B2 | 9/2017 | Dudar |
| 9,926,875 B2 | 3/2018 | Dudar et al. |
| 9,945,752 B2 | 4/2018 | Dudar |

(Continued)

OTHER PUBLICATIONS

Ford Motor Company, "2017 My OBD System Operation Summary for Plug In and Hybrid Electric Vehicles", Nov. 2015 (Year : 2015).*

(Continued)

*Primary Examiner* — Faris S Almatrahi
*Assistant Examiner* — Hongye Liang
(74) *Attorney, Agent, or Firm* — Geoffrey Brumbaugh; McCoy Russell LLP

(57) ABSTRACT

Methods and systems are provided for determining a source of degradation stemming from a vehicle fuel system during a refueling event. Specifically, in one example a method may include responsive to a refueling lock that enables access to a fuel tank of a fuel system being manually unlocked in order to add fuel to the fuel tank, monitoring a pressure in the fuel system and a fuel level in the fuel tank during refueling the fuel tank, and indicating degradation of the fuel system as a function of both the pressure and the fuel level. In this way, fuel system degradation may be pinpointed during a refueling event that is enabled via manual unlocking of the refueling lock.

9 Claims, 11 Drawing Sheets

(56) References Cited

U.S. PATENT DOCUMENTS

| | | |
|---|---|---|
| 10,018,158 B2 | 7/2018 | Dudar |
| 2007/0101973 A1* | 5/2007 | Wolber ............... F02D 41/3836 |
| | | 123/464 |
| 2012/0152210 A1 | 6/2012 | Reddy et al. |
| 2015/0075251 A1 | 3/2015 | Jentz et al. |
| 2015/0075267 A1 | 3/2015 | Sweppy et al. |
| 2015/0075501 A1 | 3/2015 | Peters et al. |
| 2017/0037806 A1 | 2/2017 | Dudar |
| 2017/0137022 A1* | 5/2017 | Dudar .................. B60W 50/14 |

OTHER PUBLICATIONS

Dudar, A. et al., "Systems and Methods for Fuel Tank Diagnostics," U.S. Appl. No. 15/728,884, filed Oct. 10, 2017, 89 pages.

Dudar, A., "Systems and Methods for Fuel System Pressure Sensor Rationalization," U.S. Appl. No. 16/148,644, filed Oct. 1, 2018, 80 pages.

* cited by examiner

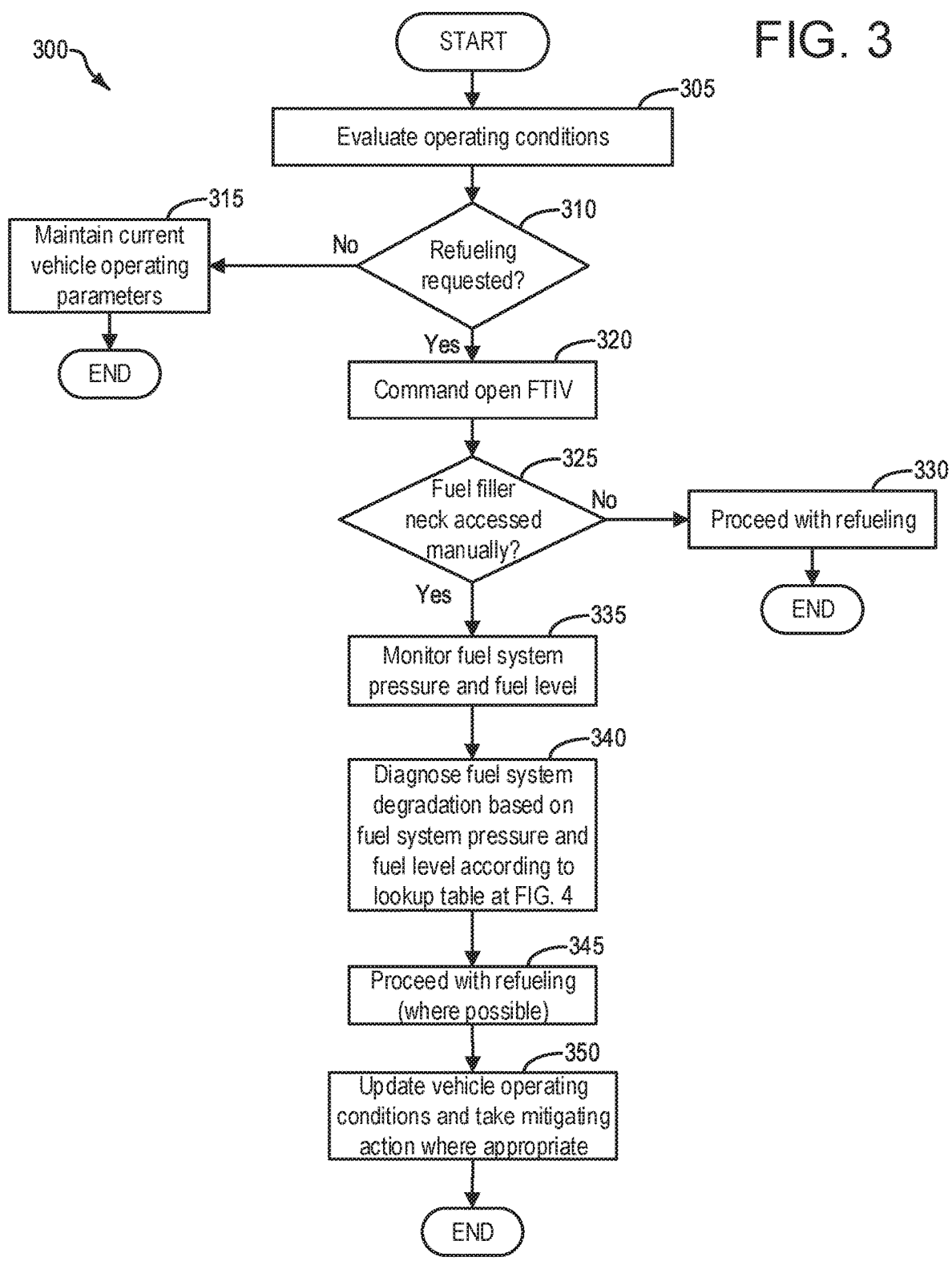

FIG. 4

| Outcome | Symptom | Diagnosis | Mitigating action |
|---|---|---|---|
| Outcome A | FTPT sensor decays to atmosphere just prior to fuel level increasing, but refueling event is plagued with one or more premature shutoff events | FTPT functioning as desired, FTIV stuck closed | Operate vehicle in electric-mode as frequently as possible. Illuminate MIL and set DTC |
| Outcome B | Premature shutoff events not observed and lack of FTPT change. Fuel level increases as expected for refueling event | FTPT stuck in range | Illuminate MIL, set DTC, and enable entry to fuel filler neck without manually opening fuel door after predetermined number of events where fuel door is manually opened |
| Outcome C | Refueling event begins with FTPT indicating an offset, and FTPT registers a pressure increase during refueling. Fuel level increases as expected for refueling event | FTPT has inherent offset | Illuminate MIL, set DTC, and enable entry to fuel filler neck without manually opening fuel door after predetermined number of events where fuel door is manually opened |

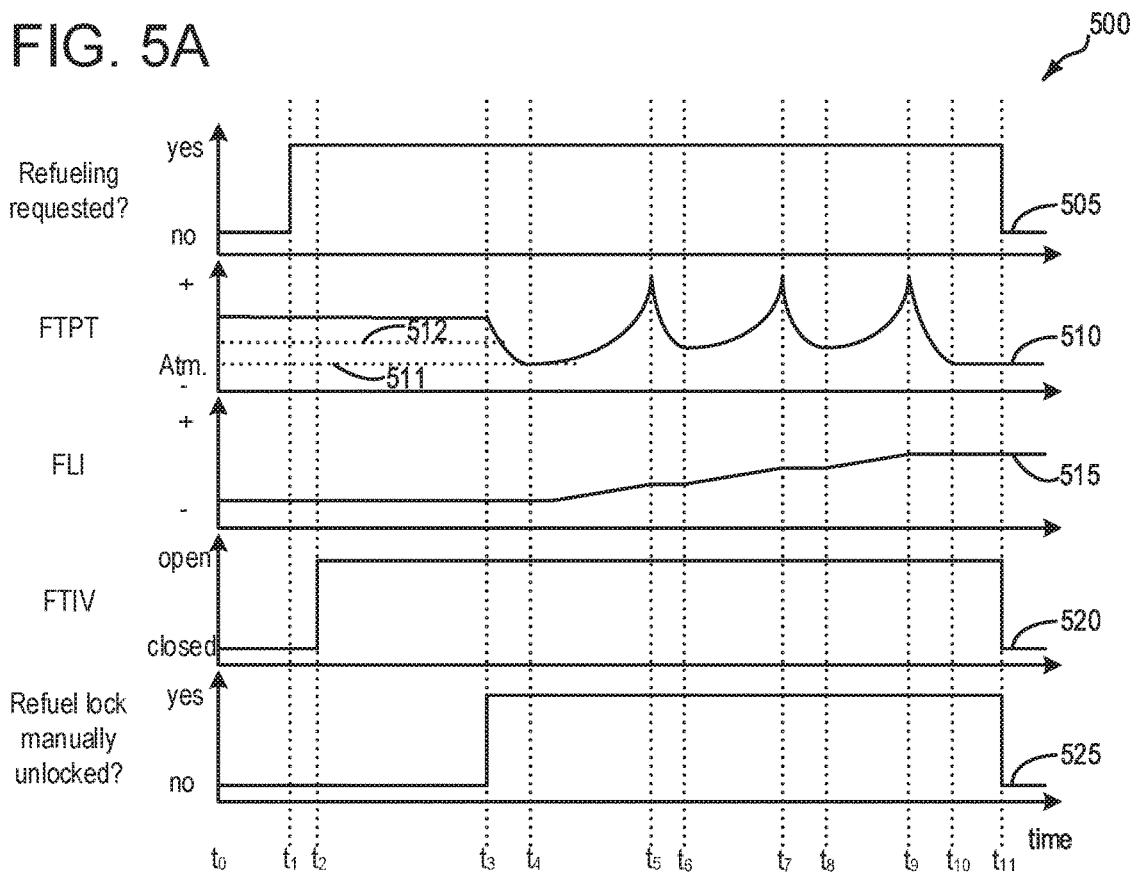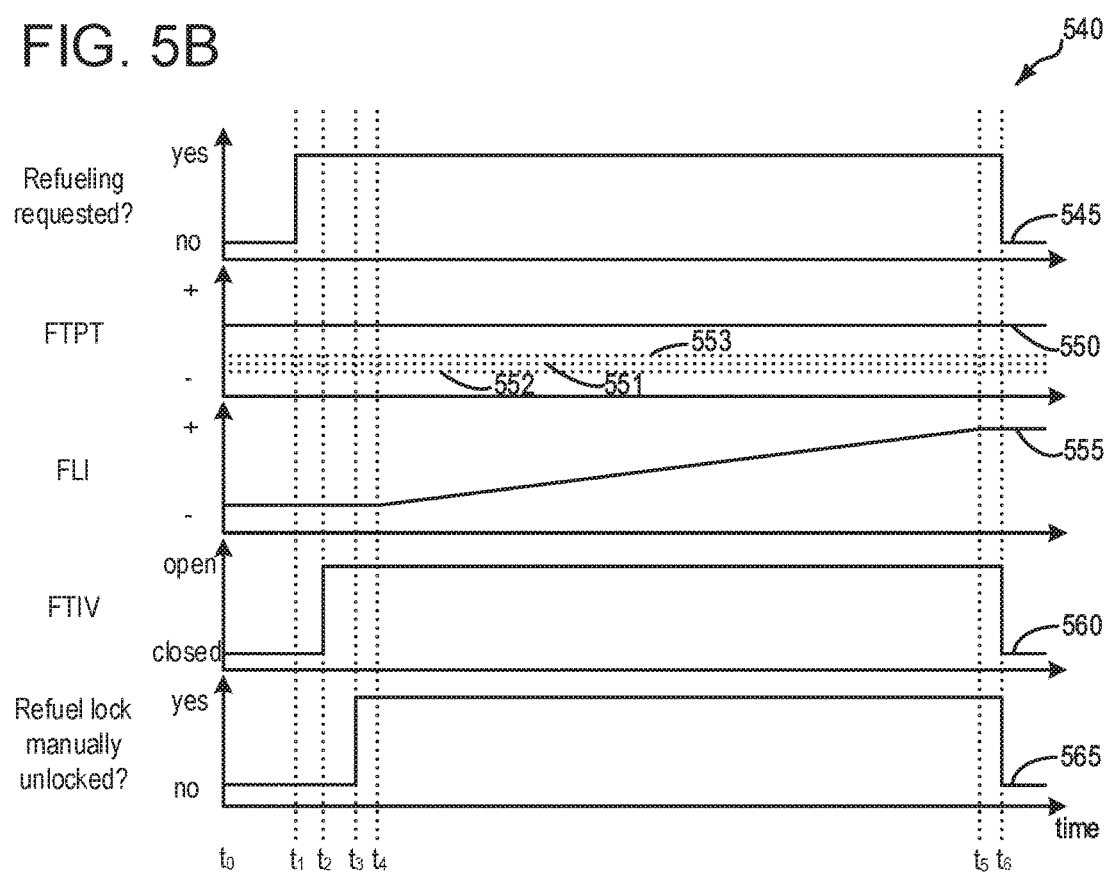

SYSTEMS AND METHODS FOR FUEL SYSTEM PRESSURE SENSOR RATIONALIZATION

FIELD

The present description relates generally to methods and systems for determining an inherent offset for a fuel tank pressure transducer.

BACKGROUND/SUMMARY

Certain hybrid electric vehicles, such as plug in hybrid vehicles (PHEVs) for example, have sealed fuel systems. The reason for a sealed fuel system is because for such vehicles, engine run time may be limited, and thus opportunities for using engine manifold vacuum to purge a fuel vapor storage canister that captures and stores fuel vapors from the fuel system, may too be limited. As such vehicles may be driven in electric only mode, if the fuel system were not sealed, diurnal and running loss fuel vapors may overload the fuel vapor storage canister, which may result in undesired bleed emissions to atmosphere.

Such fuel systems may be sealed via a fuel tank isolation valve positioned in a conduit coupling a fuel tank to such a fuel vapor storage canister. In one example, to refuel a fuel tank that is otherwise sealed, a vehicle operator may depress a switch at a dash of the vehicle, and a controller may command the fuel tank unsealed. The controller may then monitor pressure in the fuel system, and when pressure in the fuel system is within a threshold of atmospheric pressure, then a fuel door may be commanded unlocked to enable refueling.

In another example, diagnostic routines may be conducted on a fuel system and/or evaporative emissions control systems of such vehicles, to confirm that the systems are not degraded, or in other words, to ensure that there are no sources of undesired evaporative emissions stemming from the fuel system and/or evaporative emissions system. For example, undesired evaporative emissions detection routines may be performed while the engine is running using engine intake manifold vacuum. In another example, undesired evaporative emissions detection routines may be performed when the vehicle is off using engine-off natural vacuum (EONV) generated due to a change in temperature and pressure within the fuel tank following engine shutdown and/or with vacuum supplemented from a vacuum pump. In some examples for sealed fuel systems, standing pressure or vacuum greater than predetermined thresholds in the fuel system during vehicle-off conditions may be indicative of a fuel system that is free from a source of undesired evaporative emissions.

Routines such as fuel tank depressurization and/or routines for checking a presence or an absence of undesired evaporative emissions rely on a functional fuel tank pressure transducer (FTPT) to measure the pressure or vacuum within the fuel system. As such, the rationality of the FTPT must be periodically tested and confirmed. The FTPT may be tested for offset, to determine if a baseline output of the FTPT is accurate. For example, if there is an inherent offset for the FTPT, then in some cases the fuel door may not open in response to a request to refuel, which may be frustrating and inconvenient to a vehicle operator or customer. In other examples, an inherent offset of the FTPT may lead to a determination that the fuel system is free from a presence of undesired evaporative emissions, when in fact it is not.

One example approach for an FTPT offset test is shown by Jentz et al. in US 2015/0075251. Therein, the fuel tank is vented to atmosphere for a lengthy vehicle-off soak. If the FTPT is functional, a value within a threshold of atmospheric pressure should be output following the vehicle-off soak. A deviation from atmospheric pressure may result in a diagnostic trouble code (DTC) being set at the controller, and/or may result in the FTPT output being adjusted to compensate for any offset.

However, the inventors herein have recognized potential issues with such systems. As discussed above, venting the fuel tank to atmosphere may result in fuel vapor trafficking to the fuel vapor canister, which may be undesirable for vehicles with limited engine run-time as opportunities for purging the fuel vapor canister to engine intake may be limited. If the engine must be forced on to purge the canister, the fuel efficiency of the vehicle may be reduced.

Furthermore, such an approach may not be possible for autonomous vehicles or other vehicles that participate in car-sharing models. Discussed herein, a car-sharing model includes a model of car rental where people rent vehicles for short periods of time. In some examples, a customer may pay for the use of such a vehicle by the hour, as a function of miles driven, etc. Such vehicles may accumulate much more mileage in a short period of time than vehicles that do not participate in car-sharing. Accordingly, long vehicle-off soak times may not regularly occur for such vehicles in which to determine FTPT offset.

In another example, U.S. Pat. No. 8,353,273 teaches coupling a fuel tank to a pump in order to generate a pressure signal in the fuel tank and at the position of the pump, and correlating fuel tank pressure with the pressure indicated at the pump. A fault signal may be generated responsive to the correlating.

However, the inventors herein have recognized potential issues with such a system. As one example, coupling the fuel tank to the pump may result in fuel vapors from the tank being routed to the fuel vapor canister, which is undesirable in vehicles with limited engine run-time, as discussed above. Furthermore, the use of an onboard pump adds costs and complexity to the engine system, and not all current and future vehicles are being designed with such a pump. A diagnostic that does not potentially load the canister and does not include the use of a pump is desirable.

In one example, the issues described above may be addressed by a method comprising in response to a refueling lock that enables access to a fuel tank of a fuel system being manually unlocked in order to add a fuel to the fuel tank, monitoring a pressure in the fuel system via a pressure sensor and a fuel level in the fuel tank during refueling the fuel tank, and indicating degradation of the fuel system as a function of both the pressure and the fuel level. In this way, degradation may be determined without relying on a pump or on long vehicle-off soak times.

As an example, the fuel system may comprise a sealed fuel system, wherein the refueling lock being manually opened is in response to the pressure in the fuel system not becoming within a predetermined threshold of atmospheric pressure in response to a request to refuel the fuel tank, where the request includes unsealing the fuel system to couple the fuel system to atmosphere.

As another example, indicating degradation may include indicating a blockage in one or more lines between the fuel system and atmosphere in response to an indication that the pressure in the fuel system decays to atmospheric pressure just prior to the fuel level increasing in the fuel tank. The blockage may include one of a valve positioned between the fuel system and a fuel vapor storage canister being stuck closed and/or a restriction in the one or more lines between the fuel system and atmosphere. In such an example, the fuel level increasing may include one or more premature shutoffs of a refueling dispenser that is refueling the fuel tank during the refueling the fuel tank.

As another example, indicating degradation may include indicating the pressure sensor is stuck and is not responding to pressure differences, in response to an indication that the pressure in the fuel system remains unchanged during the refueling event, while the fuel level in the fuel tank increases linearly during the refueling event.

As another example indicating degradation may include indicating an offset of the pressure sensor in response to the pressure increasing during the refueling event, and where the fuel level in the fuel tank increases linearly during the refueling event. In such an example, the method may further comprise adjusting a pressure threshold for a test for a presence or an absence of undesired evaporative emissions stemming from the fuel system, as a function of the offset of the pressure sensor. Such a method may further comprise, in response to the offset being indicated a predetermined number of times, enabling access to the fuel tank of the fuel system in response to a request to refuel the fuel tank, without the refueling lock having to be manually unlocked.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 depicts an example method for determining potential issues associated with fuel tank depressurization in response to a request to refuel a fuel tank.

FIG. 4 depicts an example lookup table with several outcomes for diagnosing the fuel system according to the method depicted at FIG. 3.

FIG. 5A depicts an example timeline for a first outcome of the lookup table depicted at FIG. 4.

FIG. 5B depicts an example timeline for a second outcome of the lookup table depicted at FIG. 4.

DETAILED DESCRIPTION

The following description relates to systems and methods for diagnosing issues related to fuel system integrity. For example, fuel system integrity may relate to operational state of a fuel tank pressure transducer (FTPT) and/or to function of one or more valves configured to seal the fuel system. In some examples, fuel system integrity may relate to restrictions in one or more lines that couple the fuel system to atmosphere. The systems and methods discussed herein may be particularly useful for hybrid electric vehicles with limited engine run time, such as the hybrid vehicle depicted at FIG. 1. FIG. 2 depicts a fuel system that is selectively coupled to a fuel vapor storage canister and to atmosphere via a fuel tank isolation valve (FTIV). A fuel tank pressure transducer is positioned in a line that couples the fuel system to the fuel vapor storage canister. In one example, the fuel tank pressure transducer may be relied upon for unlocking a refueling lock (e.g. fuel door) that provides access to a fuel filler neck for refueling a fuel tank of the fuel system. Specifically, in response to a request to refuel, the FTIV may be commanded open and the refueling lock may be unlocked responsive to the FTPT indicating that the fuel system is within a threshold range of atmospheric pressure. However, if the fuel system is not depressurizing and thus not allowing access to the fuel filler neck, then either the FTPT may be degraded (e.g. stuck in range or with an inherent offset), or there may be a restriction in the one or more lines that couple the fuel system to atmosphere (e.g. FTIV stuck closed and/or blockage in the one or more lines) that is preventing depressurization. Accordingly, FIG. 3 depicts an example method for determining the source of the lack of depressurization in such situations. The example method depicted at FIG. 3 may rely on both fuel system pressure measurements and fuel level measurements during refueling the fuel tank, and a diagnosis may be made based on a lookup table, such as the lookup table of FIG. 4. Such a lookup table includes three potential outcomes, each of which are described by the timelines of FIGS. 5A-5C.

Figure 6:
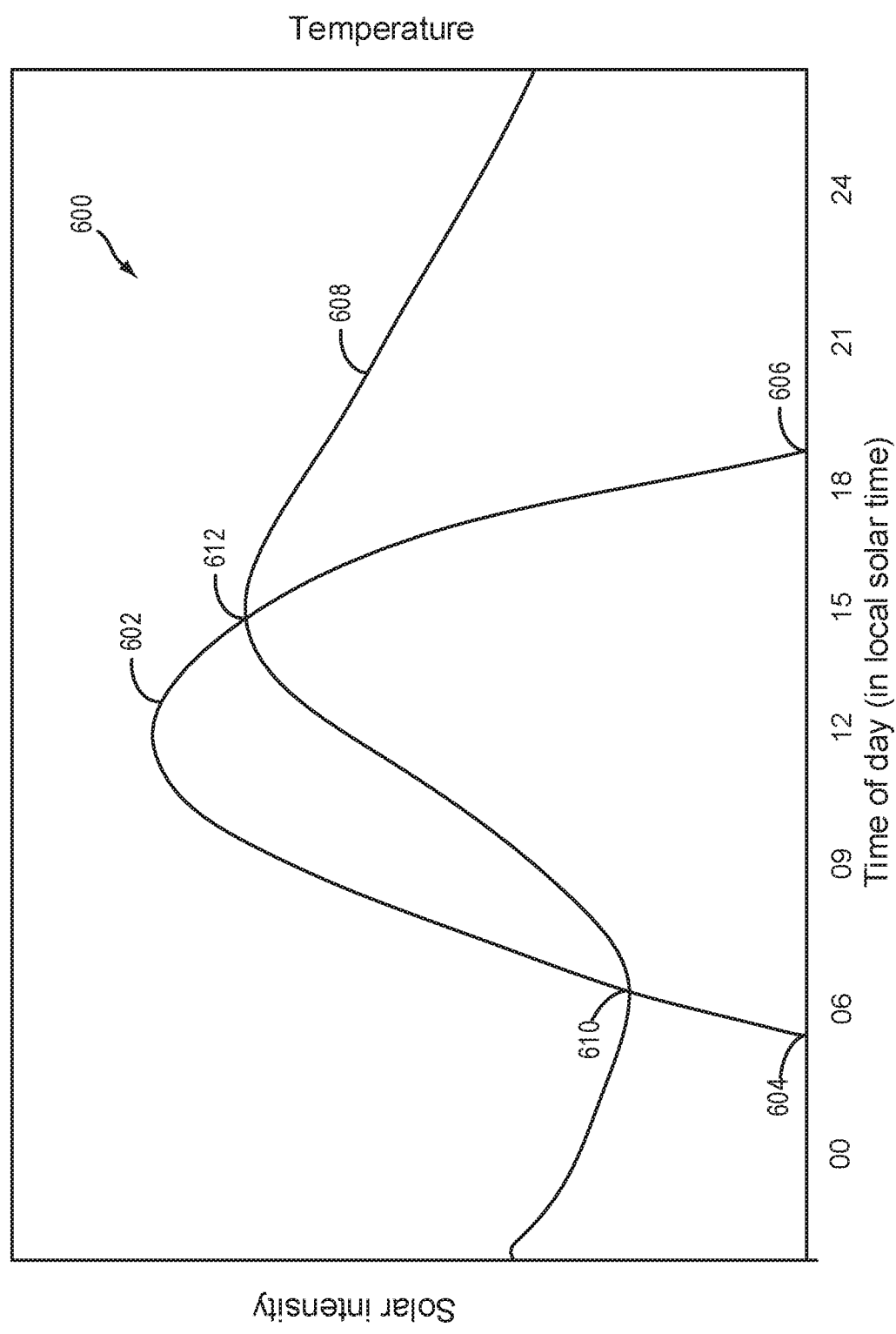
FIG. 6 schematically shows a graphic depiction of a diurnal cycle.
Figure 7:
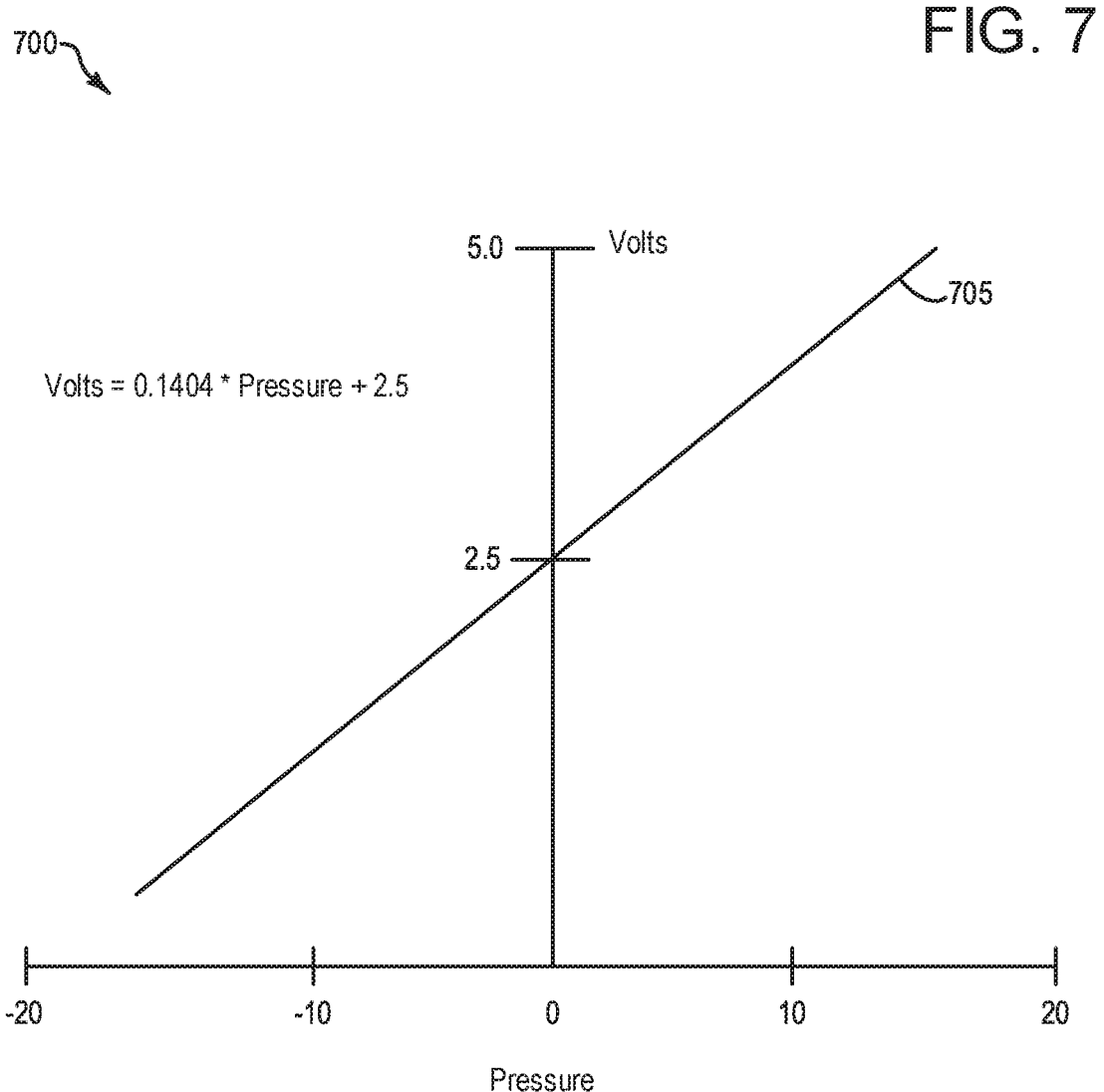
FIG. 7 graphically depicts a transfer function used to convert fuel system pressure to a voltage for use with a comparator circuit depicted at FIG. 8.
Figure 8:
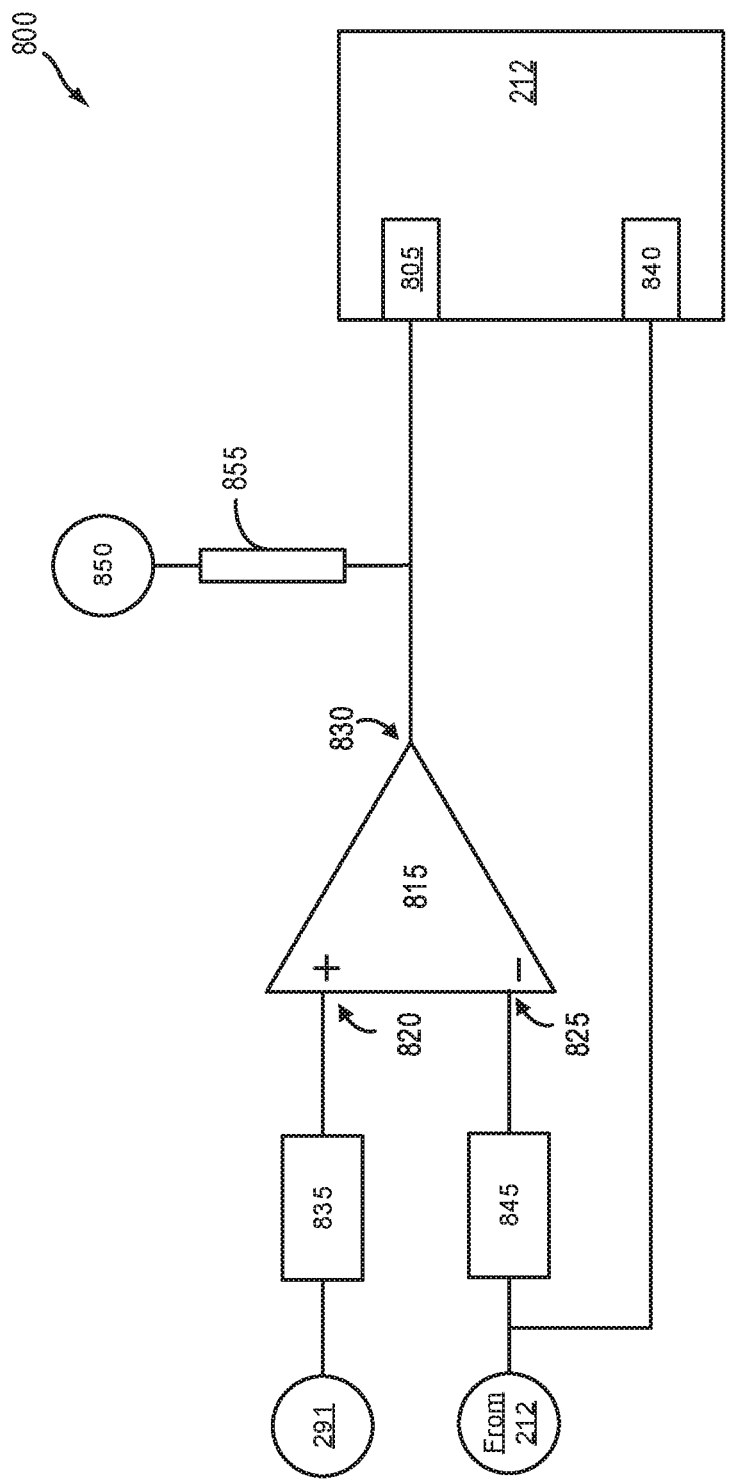
FIG. 8 schematically shows an example comparator circuit for waking a controller of a vehicle based on fuel system pressure.
Figure 9:
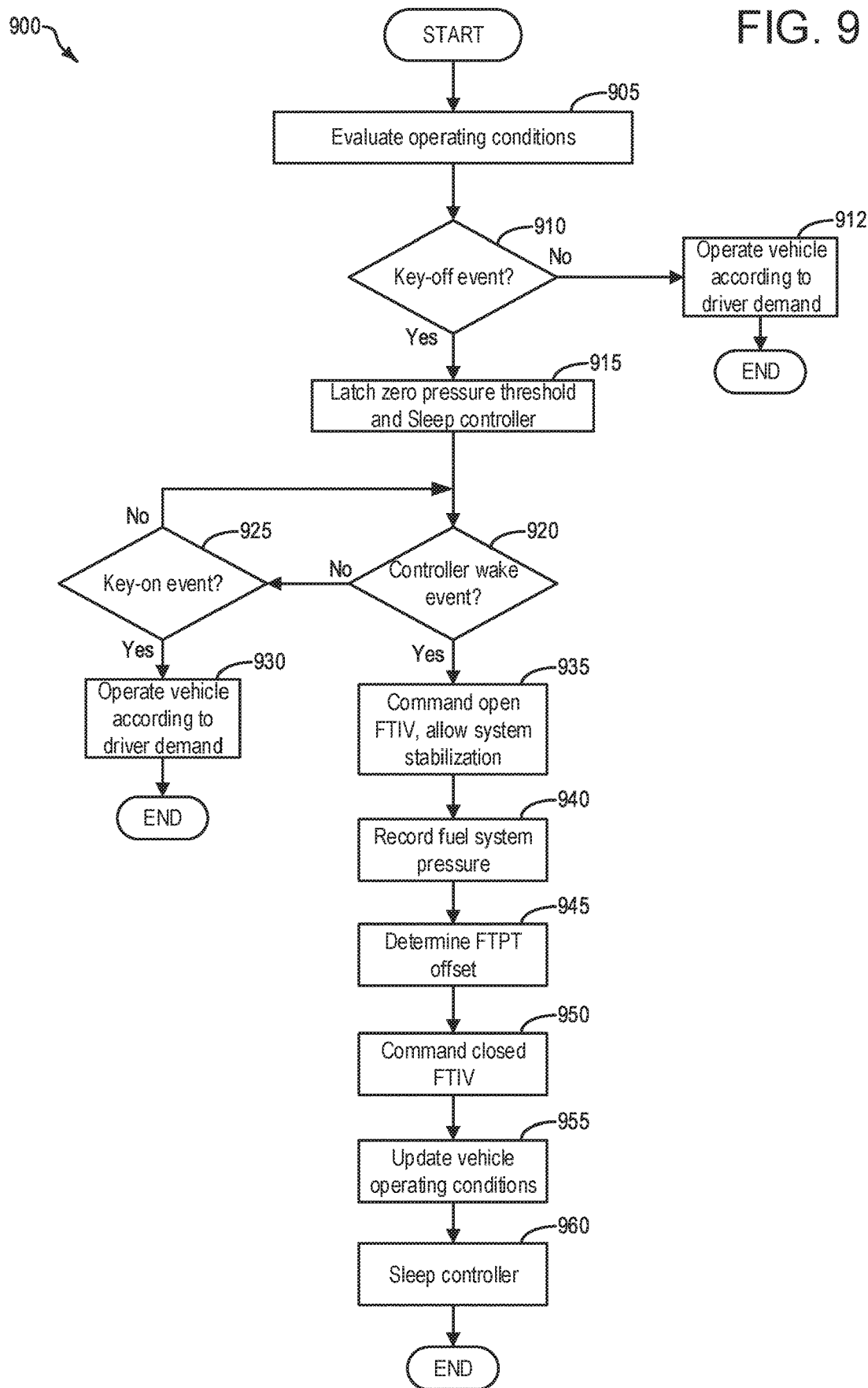
FIG. 9 depicts an example method for determining a fuel tank pressure transducer offset after the controller is woken via the comparator circuit of FIG. 8.
Figure 10:
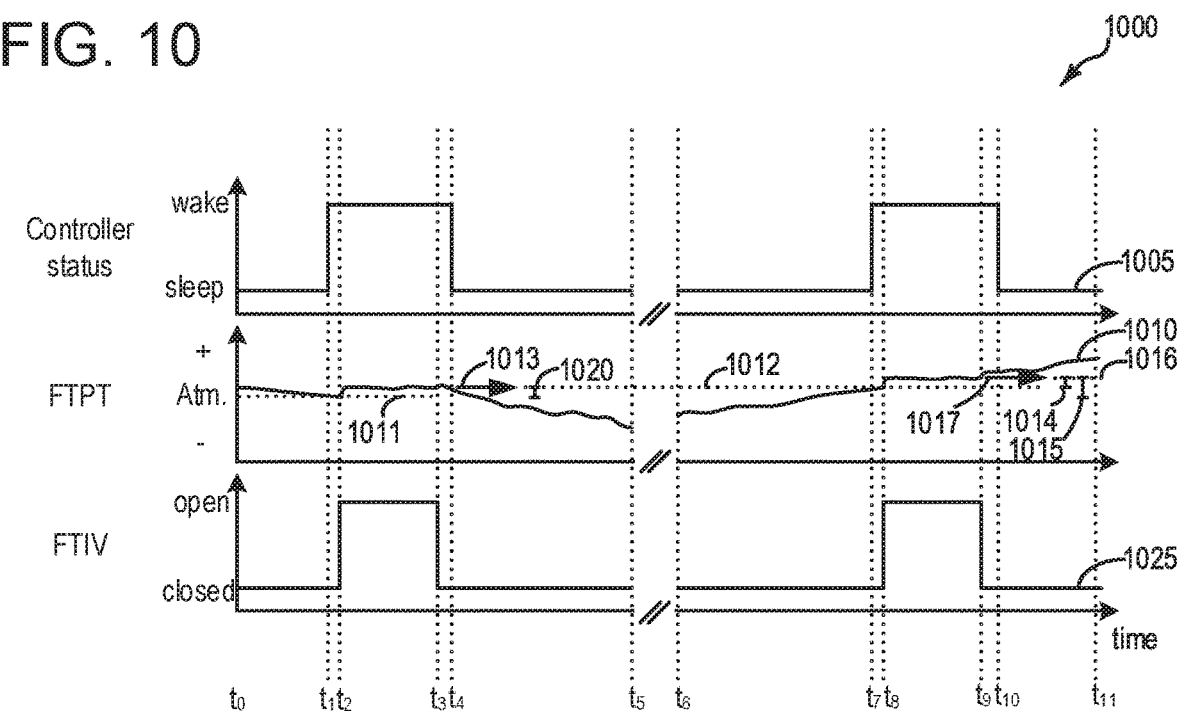
FIG. 10 depicts an example timeline for determining the fuel tank pressure transducer offset according to the method of FIG. 9.

Thus, the method of FIG. 3 relies on a refueling event, but it is herein recognized that for hybrid vehicles, such vehicles may go long periods of time without refueling, and thus another method for rationalizing the FTPT is presented that relies on diurnal cycle changes, such as the diurnal cycle depicted at FIG. 6. Such a method may include waking a controller of the vehicle at a particular time of a diurnal cycle when it is expected that the fuel system will be at or very near atmospheric pressure. In this way, the fuel system may be unsealed and FTPT offset determined, without undesirably loading the fuel vapor storage canister with fuel vapors, and/or without drawing in air into the fuel system. Such a method is depicted at FIG. 9, and relies on a transfer function as depicted at FIG. 7 for latching an input voltage to a comparator circuit that is depicted at FIG. 8, such that the comparator circuit wakes the controller when the sealed fuel system is expected to be at or near atmospheric pressure in order to determine FTPT offset as via the method of FIG. 9. A timeline depicted how the method of FIG. 9 is conducted, is depicted at FIG. 10.

Figure 1:
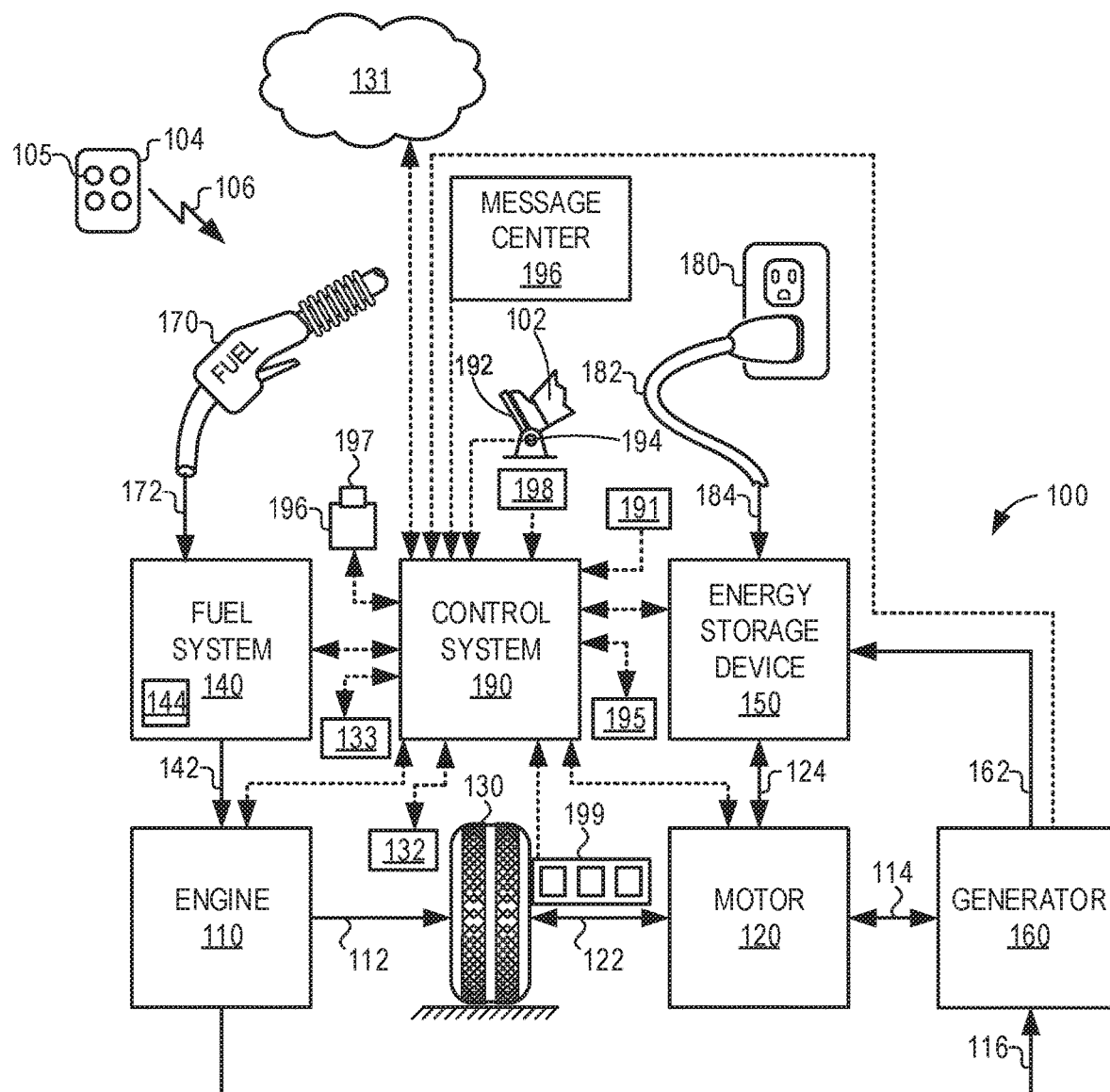
FIG. 1 schematically shows an example vehicle propulsion system.
Figure 2:
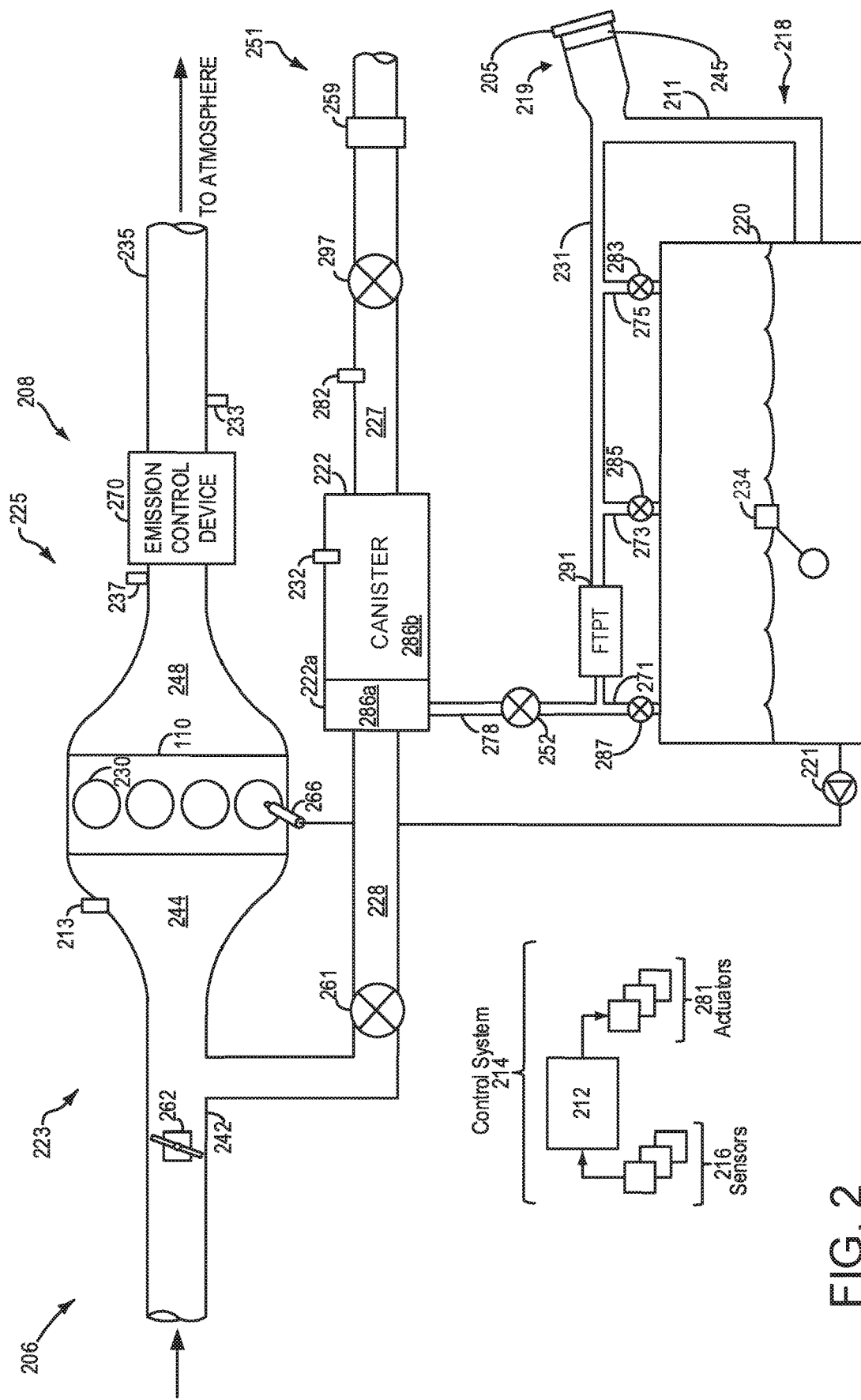
FIG. 2 schematically shows an example vehicle system with a fuel system and an evaporative emissions system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed. In some examples, a refueling lock (e.g. fuel door, etc.) may be manually opened via a vehicle operator depressing a manual refueling lock button 191. Such a manual refueling lock button may be positioned in a trunk of the vehicle, for example.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art. In some examples, control system may be coupled to other vehicles or infrastructures via wireless network 131, in order to retrieve information that may be applicable to route-learning, as will be discussed in detail below.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In one example, information received from the GPS may be utilized in conjunction with route learning methodology, such that routes commonly traveled by a vehicle may be learned by the vehicle control system 190. In some examples, other sensors, such as lasers, radar, sonar, acoustic sensors, etc., (e.g. 133) may be additionally or alternatively utilized in conjunction with the onboard navigation system to conduct route learning of commonly traveled routes by the vehicle.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system (evaporative emissions system) 251 and a fuel system 218. It may be understood that fuel system 218 may comprise the same fuel system as fuel system 140 depicted at FIG. 1. Emission control system 251 includes a fuel vapor storage container or canister 222 which may be used to capture and store fuel vapors. In some examples, vehicle system 206 may be a hybrid electric vehicle system. However, it may be understood that the description herein may refer to a non-hybrid vehicle, for example a vehicle only-equipped with an engine and not an onboard energy storage device, without departing from the scope of the present disclosure.

The engine system 208 may include an engine 110 having a plurality of cylinders 230. The engine 110 includes an engine air intake 223 and an engine exhaust 225. The engine air intake 223 includes a throttle 262 in fluidic communication with engine intake manifold 244 via an intake passage 242. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP.

Fuel system 218 may include a fuel tank 220 coupled to a fuel pump system 221. It may be understood that fuel tank 220 may comprise the same fuel tank as fuel tank 144 depicted above at FIG. 1. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. In some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, pressure sensor 282, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. Example control routines are described herein with regard to FIG. 3 and FIG. 9.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors.

Undesired evaporative emissions detection routines may be intermittently performed by controller 212 on fuel system 218 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump (where included) and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Conducting an EONV test may include four "phases". The first phase may comprise an initial vent phase. This initial vent phase is conducted to vent any vapors from a fuel slosh event from a hard stop just prior to key off. The initial vent phase may comprise 30-60 seconds, for example. The next phase of the EONV test may constitute a pressure phase. In this phase, the fuel system and evaporative emissions systems are sealed from atmosphere, and a pressure build is monitored over time. If the pressure in the fuel system and evaporative emissions system reaches a positive pressure threshold, an absence of undesired evaporative emissions may be indicated. However, if the pressure build stalls (e.g. plateaus), then the pressure in the fuel system and evaporative emissions system may be relieved, during what is referred to as the vent phase. After pressure in the fuel tank and evaporative emissions system is relieved, a vacuum phase comes next. The vacuum phase may include re-sealing the fuel system and evaporative emissions system, and monitoring a vacuum build over time. If vacuum builds to a negative pressure threshold within a predetermined duration (e.g. 45 minutes since the start of the EONV test), then an absence of undesired evaporative emissions may be indicated.

In some examples where the vehicle includes a sealed fuel tank, standing pressure in the sealed fuel tank may be indicative of an absence of undesired evaporative emissions.

For example, if pressure greater than (e.g. more positive or more negative than) a predetermined absolute pressure threshold is indicated in the fuel tank, then the absence of undesired evaporative emissions may be indicated. However, if there is an inherent offset associated with the FTPT, then there may be circumstances where the presence of undesired evaporative emissions in the fuel system may be incorrectly diagnosed as an absence of undesired evaporative emissions.

Furthermore, as discussed above, an inherent offset associated with the FTPT may result in a fuel door or other refueling lock associated with accessing a fuel filler neck (e.g. 211) unable to be opened, due to an indication of pressure in the fuel system, where in fact the fuel system may be at atmospheric pressure. However, there may be other reasons for the fuel system not depressurizing, such as a stuck closed FTIV, for example. It is herein recognized that under such a circumstance where the fuel lock does not open due to an indication that the fuel system is not sufficiently depressurized, if the fuel lock is unlocked manually, the ensuing refueling event may provide an opportunity to diagnose the reason as to why the fuel lock did not open until it was manually opened. For example, the FTPT may have an inherent offset or may be stuck in range, or the FTIV may be stuck closed. The method discussed below at FIG. 3 may enable a determination as to which may be the case for the particular situation.

Thus, the systems described herein along with the methods (see below) may enable a system for a hybrid vehicle, comprising a fuel system that includes a fuel tank selectively fluidically coupled to atmosphere via a fuel tank isolation valve, a fuel level indicator, and a fuel tank pressure transducer. The system may further include a refueling request button, a refueling lock, and a manual refueling lock button. The system may further include a controller with computer readable instructions stored on non-transitory memory that, when executed, cause the controller to receive a request to refuel the fuel tank in response to the refueling request button being depressed. The controller may store further instructions to command the fuel tank fluidically coupled to atmosphere. The controller may store further instructions to monitor a pressure in the fuel system via the fuel tank pressure transducer. The controller may store further instructions to, in response to the pressure in the fuel system not becoming within a predetermined threshold of atmospheric pressure and further responsive to the controller receiving a request to unlock the refueling lock based on a depression of the manual refueling lock button, monitor both the pressure in the fuel system and a fuel level in the fuel tank subsequent to the refueling lock being unlocked to indicate whether the fuel tank isolation valve is stuck closed or whether the fuel tank pressure transducer is degraded.

In such a system, the controller may store further instructions to indicate that the fuel tank isolation valve is stuck closed but that the fuel tank pressure transducer is functioning as expected in response to the pressure in the fuel system decaying to atmosphere after the refueling lock is unlocked but before fuel is indicated as being added to the tank, and where one or more premature shutoffs of a refueling dispenser that adds fuel to the fuel tank are indicated. The controller may store further instructions to indicate the fuel tank isolation valve is functioning as desired in response to the fuel level in the fuel tank increasing linearly after the refueling lock is unlocked, but that the fuel tank pressure transducer is degraded, wherein indicating degradation of the fuel tank pressure transducer includes indicating the fuel tank pressure transducer is stuck in response to the pressure not changing as fuel is added to the tank, or wherein indicating degradation of the fuel tank pressure transducer includes indicating the fuel tank pressure transducer has an inherent offset in response to the pressure increasing and then stabilizing as fuel is added to the fuel tank.

Turning now to FIG. 3, an example method 300 for diagnosing a vehicle fuel system during a refueling event, is shown. Specifically, method 300 may be used to diagnose whether a standing pressure in the vehicle fuel system is due to an FTPT offset or otherwise degraded FTPT, or to a stuck closed FTIV and/or restriction or blockage in one or more lines coupling the fuel system to atmosphere. Method 300 may be used during a refueling event where it is indicated that the fuel filler neck has been accessed manually, for example via a button (e.g. 191) in a trunk of the vehicle.

Method 300 will be described with reference to the systems described herein and shown in FIGS. 1-2, though it should be understood that similar methods may be applied to other systems without departing from the scope of this disclosure. Method 300 may be carried out by a controller, such as controller 212 in FIG. 2, and may be stored at the controller as executable instructions in non-transitory memory. Instructions for carrying out method 300 and the rest of the methods included herein may be executed by the controller based on instructions stored on a memory of the controller and in conjunction with signals received from sensors of the engine system, such as the sensors described above with reference to FIGS. 1-2. The controller may employ actuators such as FTIV (e.g. 252), etc., to alter states of devices in the physical world according to the method depicted below.

Method 300 begins at 305, and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 310, method 300 may include indicating whether refueling is requested by a vehicle operator. For example, refueling may be indicated to be requested if a refueling button (e.g. 197) associated with the vehicle instrument panel (e.g. 196) has been depressed. It may be understood that such a request may not unlock a refueling lock (e.g. 145), but may only signal the request to refuel, which may then be enabled in response to pressure in the fuel system becoming within a threshold (e.g. +/−5 InH2O) of atmospheric pressure.

If refueling is not requested, method 300 may proceed to 315. At 315, method 300 may include maintaining current vehicle operating parameters. For example, if the vehicle is operating via an electric-only mode, then such a mode of operation may be maintained. If the vehicle is operating via the engine, or some combination of the engine and the electrical mode of operation, then such operation may be maintained. Method 300 may then end.

Returning to 310, in response to refueling being indicated to be requested, method 300 may proceed to 320. At 320, method 300 may include commanding open the FTIV. While not explicitly illustrated, commanding open the FTIV at 320 may further include commanding open or maintaining open the CVV (e.g. 297), such that the fuel system is fluidically coupled to atmosphere (provided the FTIV is functioning as desired).

It may be understood that with the fuel system coupled to atmosphere, it may be expected that pressure in the fuel system may decrease to within the threshold of atmospheric pressure. However, in a case where the FTPT (e.g. 291) has an inherent offset, or in a case where the FTIV did not open as expected (or where there are other restrictions in the lines coupling the fuel system to atmosphere), then pressure may not decrease to within the threshold of atmospheric pressure. In such an example, the fuel filler neck may be prevented from being accessed, or in other words, the refueling lock (e.g. 245) may be maintained locked.

Accordingly, proceeding to 325, method 300 may include indicating whether the fuel filler neck was accessed manually or not. Specifically, in response to the refueling lock not opening due to pressure not decreasing to within the threshold of atmospheric pressure, a vehicle operator may manually unlock the refueling lock (which may for example comprise a fuel door lock), by depressing a manual refueling lock button (e.g. 191) positioned in a trunk of the vehicle, for example. The manual refueling lock is mentioned as being in the trunk, but may be anywhere in such a vehicle without departing from the scope of this disclosure.

Thus, in a case where the fuel filler neck is not indicated to be accessed manually, it may be understood that upon commanding open the FTIV, the fuel tank depressurized to within the threshold of atmospheric pressure thus resulting in the unlocking of the refueling lock to enable fuel to be added to the fuel system. Accordingly, in such an example, method 300 may proceed from 325 to 330, where refueling may proceed. At 330, the vehicle operator or gas station attendant may dispense a desired amount of fuel to the fuel tank, and afterward, with a desired amount of fuel having been added to the tank, method 300 may end. While not explicitly illustrated, it may be understood that in a case where the fuel system did not depressurize, but where the vehicle operator decides to drive off rather than manually open the refueling lock, then method 300 may be aborted.

Returning to 325, if the fuel filler neck is indicated to have been accessed manually, method 300 may proceed to 335. At 335, method 300 may include monitoring fuel system pressure and fuel level during refueling of the fuel tank. Fuel system pressure and fuel level may be monitored such that a diagnosis of whether the FTPT has an inherent offset, whether the FTPT is stuck in range, or whether the FTIV is stuck closed or if other restrictions are present, may be indicated. Accordingly, such a diagnosis may be made via the lookup table at FIG. 4. It may be understood that the lookup table depicted at FIG. 4 for diagnosing fuel system integrity depends on both the fuel system pressure and the fuel level during refueling of the fuel tank.

Accordingly, turning now to FIG. 4, an example lookup table 400 is depicted. Lookup table 400 includes an outcome 405 (outcomes A-C), symptoms 410 for each possible outcome, a diagnosis 415 based on the particular symptoms, and mitigating actions 420 that may be taken for each particular outcome.

Briefly, outcome A may include an indication that the FTPT sensor reports pressure decaying to atmospheric pressure just prior (e.g. less than 1 minute, or less than 30 seconds) to fuel level increasing, but where the ensuing refueling event is plagued with one or more premature shutoff events of a refueling dispenser that is dispensing fuel to the fuel tank. In such a case, the diagnosis may include a determination that the FTPT is functioning as desired, but that the FTIV is stuck closed (or that there is some other restriction preventing depressurization). More specifically, because the refueling lock was manually opened, with the refueling dispenser placed in the fuel filler neck, the fuel tank may at least partially become coupled to atmosphere. Thus, if the FTPT were functioning as desired, then once the refueling dispenser is placed in the fuel filler neck, pressure may be expected to rapidly approach atmospheric pressure. If the FTIV is stuck closed and/or if there is a restriction in the line coupling the fuel tank to the fuel vapor storage canister and/or a restriction in the vent line coupling the canister to atmosphere, then any attempt to refuel may be expected to result in premature shutoffs of the refueling dispenser. Accordingly, a rapid decay to atmospheric pressure upon insertion of the fuel dispenser into the fuel filler neck, followed by one or more premature shutoffs, may comprise outcome A, or in other words, an indication that the FTPT is functioning as desired or expected, and that the FTIV is stuck closed (or there is some other restriction in the lines coupling the fuel tank to atmosphere).

In such an example, mitigating action may include illuminating a malfunction indicator light (MIL) at the vehicle dash, to alert the vehicle operator of a request to service the vehicle. A diagnostic trouble code (DTC) may be set, and stored at the controller, indicating the issue of the stuck closed FTIV and/or restriction. Because of the inability to refuel without premature shutoffs, the vehicle may be operated in such a way as to reduce opportunity where the vehicle may have to be refueled. Specifically, the vehicle may be operated in electric-only mode as frequently as possible, until the issue has been resolved. Furthermore, any tests for undesired evaporative emissions on the fuel system and/or evaporative emissions system that rely on evacuating the fuel system and/or evaporative emissions system, may be discontinued until the issue is mitigated.

Outcome B depicts a situation where the refueling lock was manually opened, and where pressure in the fuel system does not change either just prior to or during the addition of fuel to the tank. The refueling event may proceed without premature shutoffs of the refueling dispenser, and fuel level may linearly increase over the course of the refueling event. In such an example, the FTPT may be stuck in range or in other words, not moving or registering any change in pressure, and thus may be understood to be degraded. Furthermore, for such an outcome, the FTIV may be indicated to be functioning as desired, and an absence of restrictions may be indicated in the lines that couple the fuel system to atmosphere.

Mitigating action for such an outcome B may include illuminating a MIL at the dash to alert the vehicle operator of a request to service the vehicle, and a DTC may be set related to the degraded FTPT, and may be stored at the controller. A flag may be set at the controller, indicating that refueling was requested, but that in order to do so, the refueling lock had to be manually unlocked. If such an event occurs more than a predetermined number of times (e.g. three or more) where the refueling lock has to be manually opened, then control strategy may be modified to enable the refueling lock to be unlocked in response to a request for refueling, regardless of pressure in the tank. In other words, in response to a request to refuel after the predetermined number of times the refueling lock was manually opened, the refueling lock may be opened without the vehicle operator having to manually open the lock. In other words, the controller may alter the strategy such that the request to refuel (e.g. pressing of button 197) may command unlocked the refueling lock, without reliance on fuel system depressurization.

Furthermore, because the FTPT is stuck in range, any tests for presence or absence of undesired evaporative emissions that rely on the FTPT, may be postponed until mitigating action is undertaken to resolve the issue with the FTPT.

Outcome C depicts a situation where the refueling event initiated with a particular offset that did not decay to atmospheric pressure just after inserting the refueling dispenser and prior to fuel level in the fuel tank rising. Instead, Outcome C depicts a situation where pressure rises to a steady state that is greater than the initial offset, and where fuel level in the fuel tank rises linearly without premature shutoffs. Accordingly, Outcome C is diagnosed as a situation where the FTPT has an inherent offset, but where there are no restrictions in the lines coupling the fuel tank to atmosphere and where the FTIV is not stuck closed.

With an inherent offset diagnosed as per outcome C, mitigating action may include illuminating a MIL at the dash, alerting the vehicle operator of a request to service the vehicle. A DTC may be set at the controller, reflecting the FTPT with the inherent offset. Mitigating action for outcome C may include setting a flag at the controller to reflect the inherent offset, such that if the refueling lock is manually unlocked a predetermined number of times (e.g. 3 or more), then the controller may alter its strategy to enable the refueling lock unlocked in response to a request to refuel, rather than having to manually unlock the refueling lock. In some examples, the refueling lock may be unlocked in response to a request to refuel provided that pressure in the fuel system is within a threshold (e.g. +/−5 InH2O) of the determined offset. For example, if the offset is determined to be 7 InH2O (where 7 InH2O as registered via the FTPT corresponds to atmospheric pressure due to the inherent offset), then the refueling lock may be unlocked responsive to pressure in the fuel system being anywhere from 2 InH2O to 12 InH2O.

Because for outcome C the FTPT offset is determined/known, the offset may be relied upon for any determination of a presence of absence of undesired evaporative emissions stemming from the fuel system. For example, if a fuel system pressure corresponding to 6 InH2O or greater (as an example) is used as an indication that a sealed fuel system is free from a source of undesired evaporative emissions, and there is an inherent offset of 8 InH2O, then when pressure is at 8 InH2O the fuel system may be indicated to be free from undesired evaporative emissions, when in fact there may be a source of undesired evaporative emissions stemming from the fuel system, if the offset is not accounted for. Accordingly, for outcome C, the inherent offset may be corrected for in the control strategy, such that (as per the above example) atmospheric pressure may correspond to the offset (8 InH2O), and thresholds for indicating a presence of undesired evaporative emissions may be correspondingly adjusted. For example, undesired evaporative emissions may be indicated if pressure in the sealed fuel system during a diagnostic for presence or absence of undesired evaporative emissions is 8 InH2O+/−6 InH2O. In other words, the inherent offset may become atmospheric pressure, and the thresholds may be set as +/−6 InH2O of atmospheric pressure (where atmospheric pressure corresponds to the inherent offset).

The above example relates to a situation where the fuel system is sealed (e.g. FTIV closed), and standing pressure greater than a threshold pressure (e.g. above 6 InH2O or below −6 InH2O) is used to indicate presence or absence of undesired evaporative emissions. However, there may be other tests for undesired evaporative emissions for which threshold(s) may be adjusted in response to a determination of an FTPT offset. In one example, a test for presence or absence of undesired evaporative emissions may include the fuel system and/or evaporative emissions system being evacuated via engine manifold vacuum, and in response to a predetermined threshold negative pressure being reached, the fuel system and/or evaporative emissions system may be sealed from atmosphere and a pressure bleed-up monitored. If pressure in the sealed fuel system and/or evaporative emissions system remains below a pressure bleed-up threshold (and/or if a pressure bleed-up rate is below a pressure bleed-up rate threshold), then an absence of undesired evaporative emissions may be indicated. An inherent offset of the FTPT may result in situations where a source of undesired evaporative emissions are indicated when in reality, the fuel system and/or evaporative emissions system is free from a source of undesired evaporative emissions. Alternatively, an inherent offset of the FTPT may result in situations where undesired evaporative emissions are not indicated, but should be, where the inherent offset is not accounted for. Thus, a determination of an inherent offset of the FTPT may be used to adjust the negative pressure threshold for evacuating the fuel system and/or evaporative emissions system, and may additionally be used to adjust the pressure bleed-up threshold (and pressure bleed-up rate threshold) for such types of test for undesired evaporative emissions.

Another example of a test for presence of absence of undesired evaporative emissions is based on heat rejection from an engine at a vehicle-off event, and is referred to (as discussed above) as an EONV test. As discussed, such a test includes a phase where a pressure build in the fuel system is monitored and if a positive pressure threshold is reached, then undesired evaporative emissions are not indicated. If the positive pressure threshold is not reached, then a vacuum-phase may be conducted where pressure in the fuel system is monitored as the fuel system cools and if a negative pressure threshold is reached, then undesired evaporative emissions are not indicated. Of course, an FTPT with an inherent offset may result in a vehicle fuel system being indicated to be free from undesired evaporative emissions when in fact, the positive pressure threshold and/or negative pressure threshold was only reached because of the offset. Thus, in such a case, if FTPT offset is used to appropriately adjust the positive pressure and negative pressure thresholds, then incorrect indications as related to presence or absence of undesired evaporative emissions may be avoided.

In regards to the EONV-type test described above, in a situation where FTPT offset is indicated to be 10 InH2O, then the positive pressure threshold may be increased by 10 InH2O, and the negative pressure threshold may be made less negative by 10 InH2O. In this way, an accurate indication as to presence of absence of undesired evaporative emissions may be indicated for such a test diagnostic.

Returning to FIG. 3, upon diagnosing fuel system degradation based on fuel system pressure and fuel fill level at 340, method 300 may proceed to 345. At 345, method 300 may include proceeding with refueling where possible. For example, outcome A may allow for a limited amount of refueling, as the refueling may be plagued with premature shutoffs. Alternatively, both outcomes B and C may allow for the fuel tank to be refueled without premature shutoffs.

Proceeding to step 350, method 300 may include updating vehicle operating conditions and may further include taking mitigating action. For example, updating vehicle operating conditions may include setting MILs and/or DTCs, and may further include taking the mitigating action as detailed above at FIG. 4. Method 300 may then end.

Thus, the systems and methods described above may enable a method comprising, in response to a refueling lock that enables access to a fuel tank of a fuel system being manually unlocked in order to add a fuel to the fuel tank, monitoring a pressure in the fuel system via a pressure sensor and a fuel level in the fuel tank during refueling the fuel tank; and indicating degradation of the fuel system as a function of both the pressure and the fuel level.

In such a method, the fuel system may comprise a sealed fuel system. The refueling lock being manually opened may be in response to the pressure in the fuel system not becoming within a predetermined threshold of atmospheric pressure in response to a request to refuel the fuel tank, where the request includes unsealing the fuel system to couple the fuel system to atmosphere.

In such a method, indicating degradation may include indicating a blockage in one or more lines between the fuel system and atmosphere, in response to an indication that the pressure in the fuel system decays to atmospheric pressure just prior to the fuel level increasing in the fuel tank. The blockage may include one of a valve (e.g. FTIV) positioned between the fuel system and a fuel vapor storage canister being stuck closed and/or a restriction in the one or more lines between the fuel system and atmosphere. The fuel level increasing may include one or more premature shutoffs of a refueling dispenser that is refueling the fuel tank during the refueling the fuel tank.

In such a method, indicating degradation may include indicating the pressure sensor is stuck and is not responding to pressure differences, in response to an indication that the pressure in the fuel system remains unchanged during the refueling event, while the fuel level in the fuel tank increases linearly during the refueling event.

In such a method, indicating degradation may include indicating an offset of the pressure sensor in response to the pressure increasing during the refueling event, and where the fuel level in the fuel tank increases linearly during the refueling event. In some examples, the method may further comprise adjusting a pressure threshold for a test for a presence or an absence of undesired evaporative emissions stemming from the fuel system, as a function of the offset of the pressure sensor. In response to the offset being indicated a predetermined number of times, the method may include enabling access to the fuel tank of the fuel system in response to a request to refuel the fuel tank, without the refueling lock having to be manually unlocked.

Another example of a method comprises, in response to a request to refuel a fuel tank positioned in a fuel system of a vehicle, unsealing the fuel tank to couple the fuel tank to atmosphere. In response to a pressure in the fuel system not depressurizing to within a predetermined threshold of atmospheric pressure in response to the unsealing the fuel tank and further responsive to a refueling lock that provides access to the fuel tank being indicated to be manually unlocked, monitoring the pressure in the fuel system and a fuel level during refueling the fuel tank to indicate a source for the fuel system not depressurizing in response to the unsealing the fuel tank.

In such a method, the method may further comprise indicating that the source comprises a restriction in one or more lines that couple the fuel system to atmosphere in response to the pressure in the fuel system becoming within the predetermined threshold of atmospheric pressure after the refueling lock has been manually unlocked, and just prior to the fuel level in the fuel tank increasing. In other words in response to the pressure becoming within the predetermined threshold between a brief period of time between when the refueling lock has been manually unlocked and when fuel level in the fuel tank begins increasing. The fuel level increasing may include the fuel level increasing in a step-wise fashion, the step-wise fashion indicative of one or more premature shutoffs of a refueling dispenser. In response to the indication of the restriction in the one or more lines that couple the fuel system to atmosphere, the method may include taking mitigating action to operate the vehicle in a mode that does not rely on fuel in the fuel tank, in order to conserve fuel until the restriction is remedied. The pressure in the fuel system becoming within the predetermined threshold of atmospheric pressure may be due to a refueling nozzle being inserted into a fuel filler neck of the fuel tank, thereby coupling the fuel tank to atmosphere via a route that is different than the one or more lines that couple the fuel system to atmosphere.

In such a method, the method may further comprise, in response to an indication that the fuel level in the fuel tank increases linearly during the refueling the fuel tank, indicating that the source for the fuel system not depressurizing includes a pressure sensor that is stuck, responsive to the pressure not changing during the refueling the fuel tank. The method may alternatively include indicating that the source for the fuel system not depressurizing includes the pressure sensor having an inherent offset responsive to the pressure increasing and stabilizing during the refueling event. The inherent offset of the pressure sensor may comprise the pressure in the fuel system after the refueling lock is manually unlocked, and prior to fuel being added to the fuel tank. Furthermore, the method may include adjusting a pressure threshold for indicating a presence or an absence of undesired evaporative emissions via a fuel system diagnostic as a function of the inherent offset. The method may still further include adjusting a depressurization threshold for indicating that the fuel system is depressurized, as a function of the inherent offset.

Turning now to FIG. 5A, an example timeline 500 is depicted, illustrating outcome A as depicted at FIG. 4, as determined via the method of FIG. 3. Timeline 500 includes plot 505, indicating whether refueling is requested (yes or no), over time. It may be understood that a refuel request as per plot 505 includes a vehicle operator depressing a refueling button (e.g. 197) at the dash (e.g. 196). It may be further understood that such a request does not automatically result in the refueling lock (e.g. 245) being unlocked. Timeline 500 further includes plot 510, indicating fuel system pressure as monitored via an FTPT (e.g. 291). Line 511 represents atmospheric pressure, and line 512 represents a predetermined threshold away from atmospheric pressure, where, if below, the fuel system may be indicated to be depressurized. While not explicitly illustrated, another predetermined threshold may be below atmospheric pressure, the same amount away from atmospheric pressure as line 512. Timeline 500 further includes plot 515, indicating fuel level in a fuel tank of the fuel system. Fuel level may be monitored via a fuel level indicator (FLI) (e.g. 234), and may increase (+) or decrease (−) over time. Timeline 500 further includes plot 520, indicating a status of an FTIV (e.g. 252), over time. The FTIV may be either commanded fully open or fully closed, over time. Timeline 500 further includes plot 525, indicating whether the refueling lock (e.g. 245) has been manually unlocked (yes or no), over time. As discussed above, manually unlocking the refueling lock may include depression of a manual refueling lock button (e.g. 191) positioned for example in a trunk of the vehicle.

At time t0, while not explicitly illustrated it may be understood that the vehicle is in motion, and is traveling to a refueling station. Accordingly, refueling has not yet been requested (plot 505), pressure in the fuel tank is above atmospheric pressure (plot 510), and fuel level in the tank is relatively low (plot 515). The FTIV is closed (plot 520), and the refueling lock has not been manually unlocked (plot 525).

At time t1, refueling is requested (plot 505). Accordingly, at time t2, the FTIV is commanded open to depressurize the fuel system, prior to enabling refueling to commence (prior to unlocking the refueling lock). However, between time t2 and t3, pressure in the fuel system does not decline. With pressure in the fuel system not declining, it may be understood that the refueling lock remains locked. Accordingly, at time t3, the refueling lock is manually unlocked via the vehicle operator (plot 525).

In response to the refueling lock being manually unlocked, between time t3 and t4, pressure in the fuel system decays to atmospheric pressure, represented by line 511. Thus, between time t3 and t4 it may be understood that a refueling nozzle was inserted into the fuel filler neck, thus coupling the fuel system to atmosphere, and as a result pressure in the fuel system rapidly decayed to atmospheric pressure. Between time t4 and t5, pressure in the fuel system steadily rises (plot 510) and fuel level increases (plot 515), yet at time t5, pressure in the fuel system peaks and then rapidly declines between time t5 and t6. Furthermore, fuel level stabilizes and does not rise further between time t5 and t6. Thus, it may be understood that at time t5 a premature shutoff of the refueling dispenser occurred due to pressure in the fuel system rising to a point where it induced automatic shutoff of the refueling dispenser.

Between time t6 and t7, pressure in the fuel system again rises and peaks (plot 510), and fuel is again dispensed into the fuel tank (plot 515). At time t7, another premature shutoff of the refueling dispenser is induced, thus between time t7 and t8 pressure in the fuel system again rapidly declines and fuel ceases to be added to the fuel tank. Between time t8 and t9, pressure again rises in the fuel system (plot 510) and fuel is once again dispensed into the fuel tank (plot 515). At time t9, another premature shutoff of the refueling dispenser is induced, thus between time t9 and t10 pressure in the fuel system rapidly declines and fuel is no longer dispensed into the fuel tank. No further attempts at dispensing fuel into the fuel tank are attempted after time t10. With the fuel system at atmospheric pressure, the FTIV is commanded closed. While not explicitly illustrated, it may be understood that by time t11, the refueling lock is again locked, and thus refueling is no longer requested (plot 505) and the refueling lock is thus no longer indicated to be manually unlocked (plot 525).

Thus, timeline 500 indicates outcome A as depicted at FIG. 4, because it was observed that pressure in the fuel system rapidly decayed to atmospheric pressure between time t3 and t4 in response to the refueling dispenser being inserted into the fuel filler neck, and that subsequent attempts to refuel the fuel tank included a number of premature shutoffs of the refueling dispenser. Thus, such a timeline indicates a situation where the FTPT is functioning as desired but where the FTIV is either stuck closed or there is a restriction in one of the lines coupling the fuel system to atmosphere during the refueling event.

Turning now to FIG. 5B, another example timeline 540 is depicted. Timeline 540 depicts example outcome B, as discussed above at FIG. 4. Timeline 540 includes plot 545, indicating whether refueling is requested (yes or no), over time. It may be understood that a refuel request as per plot 545 includes a vehicle operator depressing a refueling button (e.g. 197) at the dash (e.g. 196). It may be further understood that such a request does not automatically result in the refueling lock (e.g. 245) being unlocked. Timeline 540 further includes plot 550, indicating fuel system pressure as monitored via an FTPT (e.g. 291). Line 551 represents atmospheric pressure, and lines 552 and 553 represent predetermined thresholds away from atmospheric pressure, where, if pressure is below plot 553 and above plot 552, the fuel system may be indicated to be depressurized. In other words, if pressure is between lines 552 and 553, then the fuel system may be determined to be depressurized. Timeline 540 further includes plot 555, indicating fuel level in a fuel tank of the fuel system. Fuel level may be monitored via a fuel level indicator (FLI) (e.g. 234), and may increase (+) or decrease (−) over time. Timeline 540 further includes plot 560, indicating a status of an FTIV (e.g. 252), over time. The FTIV may be either commanded fully open or fully closed, over time. Timeline 540 further includes plot 565, indicating whether the refueling lock (e.g. 245) has been manually unlocked (yes or no), over time. As discussed above, manually unlocking the refueling lock may include depression of a manual refueling lock button (e.g. 191) positioned for example in a trunk of the vehicle.

At time t0, while not explicitly illustrated it may be understood that the vehicle is in motion, and is traveling to a refueling station. Accordingly, refueling has not yet been requested (plot 545), pressure in the fuel tank is above atmospheric pressure (plot 550), and fuel level in the tank is relatively low (plot 555). The FTIV is closed (plot 560), and the refueling lock has not been manually unlocked (plot 565).

At time t1, refueling is requested (plot 545). Accordingly, at time t2, the FTIV is commanded open to depressurize the fuel system, prior to enabling refueling to commence (prior to unlocking the refueling lock). However, between time t2 and t3, pressure in the fuel system does not decline. With pressure in the fuel system not declining, it may be understood that the refueling lock remains locked. Accordingly, at time t3, the refueling lock is manually unlocked via the vehicle operator (plot 525).

In response to the refueling lock being manually unlocked, between time t3 and t4 pressure in the fuel system does not decay to atmospheric pressure, represented by line 551. However, at time t4 fuel level in the fuel tank begins to rise, and between time t4 and t5, fuel level in the fuel tank linearly increases. Thus, it may be understood that although the refueling dispenser was placed in the fuel filler neck thus coupling the fuel system to atmospheric pressure, pressure in the fuel system did not decay, and furthermore, pressure did not change upon fuel being added to the tank between time t4 and t5. Because no premature shutoffs of the refueling dispenser are indicated between time t4 and t5, the issue of why the fuel tank did not initially depressurize cannot be attributed to the FTIV being stuck closed, or to restrictions in the lines coupling the fuel system to atmosphere. Instead, the reason for the lack of depressurization of the fuel tank is because the FTPT is stuck in range as discussed above with regard to FIG. 4, outcome B.

Between time t5 and t6, no further fuel is dispensed, and while not explicitly illustrated, it may be understood that the refueling lock is once again locked, and accordingly, refueling is no longer requested (plot 545), the FTIV is commanded closed (plot 560) and the refuel lock is no longer indicated to be manually unlocked (plot 565).

Figure 5C:
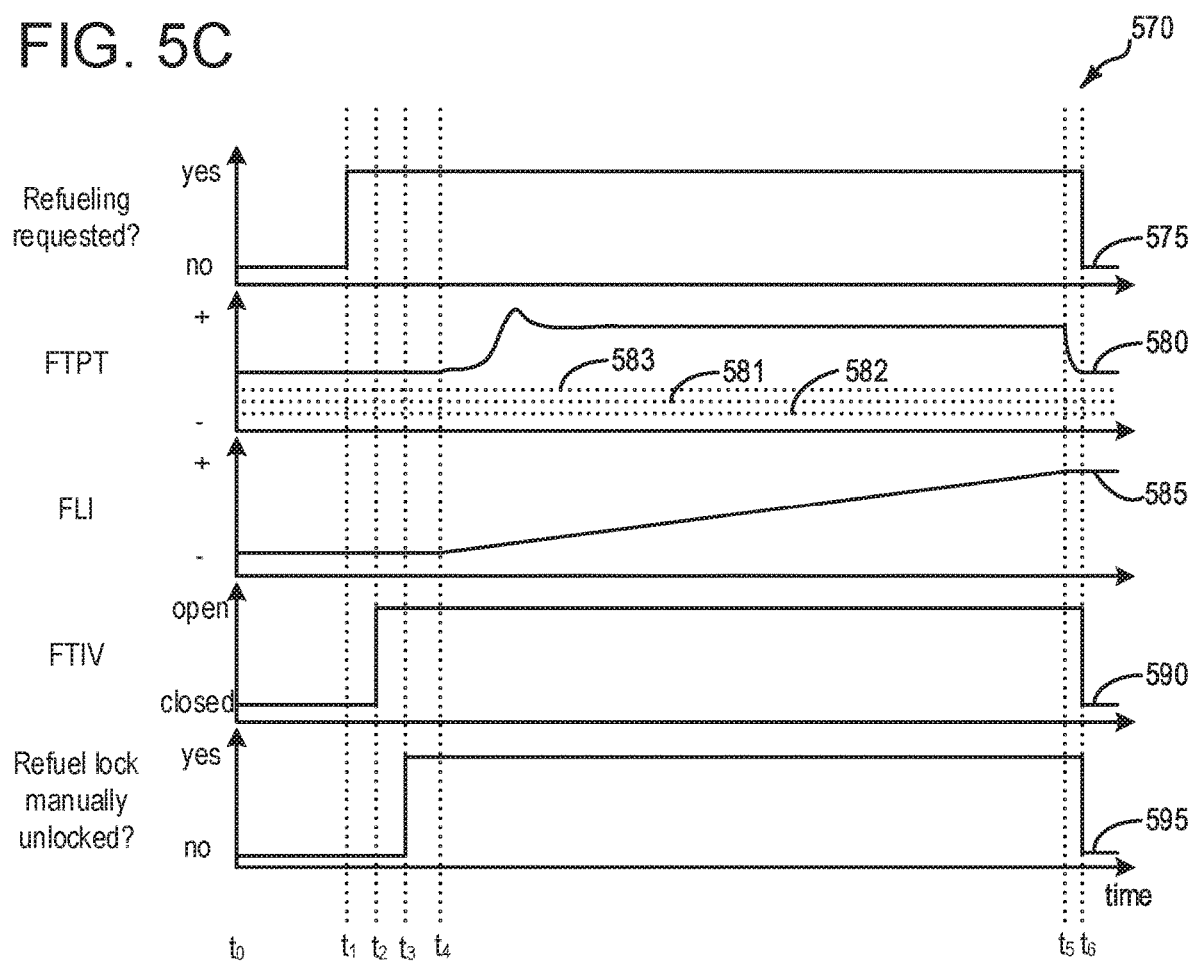
FIG. 5C depicts an example timeline for a third outcome of the lookup table depicted at FIG. 4.

Turning now to FIG. 5C, another example timeline 570 is depicted. Timeline 570 depicts example outcome C, as discussed above at FIG. 4. Timeline 570 includes plot 575, indicating whether refueling is requested (yes or no), over time. It may be understood that a refuel request as per plot 575 includes a vehicle operator depressing a refueling button (e.g. 197) at the dash (e.g. 196). It may be further understood that such a request does not automatically result in the refueling lock (e.g. 245) being unlocked. Timeline 570 further includes plot 580, indicating fuel system pressure as monitored via an FTPT (e.g. 291). Line 581 represents atmospheric pressure, and lines 582 and 583 represent predetermined thresholds away from atmospheric pressure, where, if below plot 583 or above plot 582, the fuel system may be indicated to be depressurized. In other words, if pressure is between lines 582 and 583, then the fuel system may be determined to be depressurized. Timeline 570 further includes plot 585, indicating fuel level in a fuel tank of the fuel system. Fuel level may be monitored via a fuel level indicator (FLI) (e.g. 234), and may increase (+) or decrease (−) over time. Timeline 570 further includes plot 590, indicating a status of an FTIV (e.g. 252), over time. The FTIV may be either commanded fully open or fully closed, over time. Timeline 570 further includes plot 595, indicating whether the refueling lock (e.g. 245) has been manually unlocked (yes or no), over time. As discussed above, manually unlocking the refueling lock may include depression of a manual refueling lock button (e.g. 191) positioned for example in a trunk of the vehicle.

At time t0, while not explicitly illustrated it may be understood that the vehicle is in motion, and is traveling to a refueling station. Accordingly, refueling has not yet been requested (plot 575), pressure in the fuel tank is above atmospheric pressure (plot 580), and fuel level in the tank is relatively low (plot 585). The FTIV is closed (plot 590), and the refueling lock has not been manually unlocked (plot 595).

At time t1, refueling is requested (plot 575). Accordingly, at time t2, the FTIV is commanded open to depressurize the fuel system, prior to enabling refueling to commence (prior to unlocking the refueling lock). However, between time t2 and t3, pressure in the fuel system does not decline. With pressure in the fuel system not declining, it may be understood that the refueling lock remains locked. Accordingly, at time t3, the refueling lock is manually unlocked via the vehicle operator (plot 595).

In response to the refueling lock being manually unlocked, between time t3 and t4, pressure in the fuel system does not decay to atmospheric pressure, represented by line 551. However, at time t4 fuel level in the fuel tank begins to rise, and between time t4 and t5, fuel level in the fuel tank linearly increases. Thus, it may be understood that although the refueling dispenser was placed in the fuel filler neck thus coupling the fuel system to atmospheric pressure, pressure in the fuel system did not decay. However, as fuel is dispensed into the fuel tank between time t4 and t5, pressure in the fuel system increases from the value it was prior to fuel being added to the fuel tank, and stabilizes at a new higher pressure level (plot 580). At time t5 it may be understood that the refueling dispenser is withdrawn from the fuel filler neck (without an automatic shutoff being induced). Thus, no further fuel is dispensed between time t5 and t6, and pressure rapidly decays to the offset value the pressure was at prior to the fuel tank receiving fuel from the dispenser (plot 580). While not explicitly illustrated, the refueling lock is re-locked just prior to time t6. At time t6, refueling is no longer requested, the FTIV is commanded closed, and the refueling lock is no longer indicated to be manually unlocked.

Accordingly, timeline 540 illustrates a situation corresponding to outcome C, where there is an inherent offset in the FTPT, but otherwise the FTPT is functioning as desired, and there are no indications that the FTIV is stuck closed and/or that there are any restrictions in the lines coupling the fuel system to atmosphere. It may be understood that the offset corresponding to the amount above atmospheric pressure as read by the FTPT while the fuel system is coupled to atmospheric pressure (between time t2-t4) may be used to compensate any tests for presence or absence of undesired evaporative emissions that rely on the FTPT. Furthermore, as discussed above the offset may be used to reconfigure control strategy for depressurizing the fuel system, such that the offset value may correspond to atmospheric pressure, and the fuel system may be indicated as being depressurized when pressure in the fuel system is within +/−5 InH2O of the offset value. This may enable the refueling lock to be unlocked in response to the request for refueling, without the vehicle operator having to manually unlock the refueling lock. In some examples, compensation whereby a request for refueling (without having to manually unlock the refueling lock) may be sufficient to command the refueling lock unlocked may be established after a predetermined number of times (e.g. 3) that the vehicle operator manually has to unlock the refueling lock to commence refueling. More specifically, after the predetermined number of times that the refueling lock has to be manually unlocked in response to a request to refuel, then control strategy may be modified such that the act of requesting refueling (e.g. pressing of button 197) may trigger the refueling lock unlocked, without reliance on the FTPT, in some examples.

While a refueling event may comprise an event whereby the FTPT may be rationalized and any inherent offset determined, and which may enable a determination as to whether a reason for a lack of fuel tank depressurization is likely due to a degraded FTPT or a degraded FTIV (or a restriction in one or more lines coupling the fuel tank to atmosphere), it is herein recognized that there may be other opportunities for determining FTPT offset.

Specifically, it is herein recognized that a refueling event may be a rare event for certain hybrid electric vehicles, such as plug-in hybrid electric vehicles, for example. Thus, it may not be desirable to rely solely on refueling events for rationalizing the FTPT and/or determining FTPT offset. However, because a sealed fuel tank is at most times under either positive or negative pressure with respect to atmospheric pressure, it may not be desirable to simply unseal the fuel system to rationalize the FTPT, as venting the fuel tank with positive pressure therein may undesirably load the canister with fuel vapors and as venting the fuel tank with negative pressure therein may undesirably draw in air into the fuel tank, which may disturb partial pressures and cause further vaporization. Drawing air into the tank may also prematurely age the fuel therein, resulting in the fuel losing its volatility which is undesirable particularly in a PHEV where fuel may remain in a tank for a prolonged period of time as the vehicle is regularly charged.

However, there are certain points during a diurnal cycle where pressure in a sealed fuel tank may be at atmospheric pressure, specifically during a transition from a heat gain portion of the diurnal cycle to a heat loss portion of the diurnal cycle. If the fuel system is unsealed at such a time, then neither undesirable loading of the canister nor the drawing in of air to the fuel system may occur, and the FTPT may be rationalized.

Turning now to FIG. 6, an example illustration of a diurnal cycle 600 as a graph of solar intensity and temperature as a function of the time of day, is shown. Incoming solar radiation 602 begins increasing at sunrise 604, and rises to a maximum near mid-day before declining until sunset 606. As such, sunrise 604 marks a time of day near where a heat gain cycle is at its greatest, and sunset 606 marks a time of day near where a heat loss cycle is at its greatest. Accordingly, ambient temperature 608 is shown, illustrating the increase in temperature from a minimum temperature 610 near sunrise 604, and the decrease in temperature from a maximum temperature 612 prior to sunset 606. As such, if a fuel system is sealed during the heat gain cycle, it may be expected that pressure may build in the sealed fuel system. Alternatively, if the fuel system is sealed during the heat loss cycle, then it may be expected that the outside temperatures may serve to reduce pressure in the sealed fuel system.

Accordingly, during the course of a diurnal cycle, there may be a point or points at which pressure in the sealed fuel system is at atmospheric pressure. Specifically, when a positive pressure exists in the fuel system, as the fuel system cools during the diurnal cycle, pressure may be reduced until the fuel system is at atmospheric pressure, just prior to transitioning to building a negative pressure in the sealed fuel system. Alternatively, when a negative pressure exists in the fuel system, as the fuel system warms during the diurnal cycle, pressure may become equivalent to atmospheric pressure just prior to transitioning to building a positive pressure in the sealed fuel system. However, determining exactly what point at which a sealed fuel system will be at atmospheric pressure may be challenging. To accomplish such a task, a wakeup circuit may be employed, which may wake a controller of the vehicle at precisely the time when pressure in the sealed fuel system is at atmospheric pressure.

Turning to FIG. 7, an example transfer function for a wakeup circuit (see FIG. 8) is depicted. Graph 700 includes pressure along the horizontal axis (or x-axis) and volts along the vertical axis (or y-axis). Plot 705 depicts the example transfer function, which may be represented by the following equation:

$$\text{Volts}=0.1404*\text{Pressure}+2.5 \tag{Eq. 1}$$

For example, if it is desired to wake the controller in order to conduct an FTPT offset determination at a point when pressure in a sealed fuel system is at atmospheric pressure (0), then a value of 2.5 volts may be calculated based on the transfer function (Eq. 1) above. This voltage may be applied via a latching chip on a comparator circuit (see FIG. 8). The latching chip, in one example, may be an 8-bit latching chip. In the example, the 2.5 volts may be programmed into a digital/analog converter which applies the programmed voltage on the comparator circuit.

Upon determining the zero pressure cross threshold (also referred to as atmospheric pressure) in volts, the controller may sleep while the comparator circuit is maintained awake. The comparator circuit may receive power from a battery of the vehicle. In one example, the comparator circuit may be a hot at all times (HAAT) comparator circuit. In this way, when outside temperatures due to the diurnal cycle are such that the sealed fuel system is at atmospheric pressure, as sensed for example via the FTPT (e.g. 291), the controller may be woken in order to conduct a diagnostic to determine FTPT offset.

Turning now to FIG. 8, an example comparator circuit 800 operable to wake the controller at a time following a vehicle-off condition where the sealed fuel system is at atmospheric pressure, is depicted. Comparator circuit 800 may include controller 212. The controller may activate the comparator circuit 800 following a vehicle-off event when a request for FTPT offset determination is indicated. For a hybrid vehicle, a vehicle-off event may include the vehicle being turned off or deactivated completely. In some examples, vehicle-off may include a key-off event where the vehicle is powered off.

Controller 212 may include wake input 805. Wake input 805 may be coupled to one or more inputs configured to wake up the controller when the controller is asleep following a vehicle-off condition. In response to a request to conduct a diagnostic to determine FTPT offset, the controller may determine the voltage corresponding to atmospheric pressure (see the transfer function depicted at FIG. 7). While the controller is asleep, energy may be saved by shutting down on-board sensors, actuators, auxiliary components, diagnostics, etc. Essential functions, such as clocks and controller and battery maintenance operations may be maintained active during the sleep mode, but may be operated in a reduced power mode. During the awake mode, the controller may be operated at full power, and components regulated by the controller may be operated as dictated by engine and vehicle operating conditions.

Wake input 805 may be configured to trigger controller 212 to wake up when a signal is received indicating that pressure in the sealed fuel system is equal to the zero pressure cross threshold. Wake input 805 may be coupled to op-amp 815. Op-amp 815 may comprise a first input 820, a second input 825, and an output 830. In the depicted example, first input 820 is depicted as a positive input and second input 825 is configured as a negative input. In other examples, these configurations may be reversed. Thus, in the depicted configuration, the output 830 of comparator circuit 800 may be a difference between the first input 820 and the second input 825.

In this configuration, wake input 805 is configured to wake controller 212 when a zero signal is received from output 830. Op-amp 815 is configured to output a zero signal via output 830 when the value of a voltage at first input 820 is equal to the value of a voltage at second input 825. First input 820 is coupled to FTPT 291. The signal from the FTPT may be processed, for example band-pass filtered, via filter 835 before being communicated to op-amp 815. In one example, filter 835 may be a low pass filter. Second input 825 is coupled to digital/analog output 840 from controller 212 via latching chip 845. As such, once the controller determines the zero pressure cross threshold, the threshold is converted to a voltage reading (as described above with regard to FIG. 7) and the voltage reading is latched via latching chip 845. The controller may sleep after the latching chip latches the voltage reading. Thus, comparator circuit 800 may compare actual pressure of the sealed fuel system as sensed by the FTPT 291 to the threshold pressure (zero pressure cross threshold), such that the controller is awoken when pressure as monitored via the FTPT coincides with the pressure corresponding to the latched voltage reading.

In other words, as the output 830 of comparator circuit 800 is a difference between an output of the FTPT 291 (converted to voltage) and the latched voltage, the op-amp 815 may provide a zero signal as output 830 when pressure in the sealed fuel system reaches the zero pressure cross threshold.

Comparator circuit 800 may be configured as a HAAT circuit and as such, comparator circuit 800 may be a differential op-amp circuit. Comparator circuit 800 may receive power from voltage source 850. Voltage source 850 may be a battery or other energy storage device and may be coupled to the comparator circuit via pull-up resistor 855.

In this manner, the controller may be woken precisely at a time when it is expected that pressure in the sealed fuel system may be at atmospheric pressure. In this way, if the FTIV is commanded open, the canister with be neither loaded with fuel vapors stemming from the fuel system, nor will air be inducted into the fuel tank.

It may be understood that the sensor (e.g. FTPT) for which offset is being determined is also the sensor that is relied upon for waking the controller in order to conduct the diagnostic to determine offset. Thus, if an offset is indicated, then it may be understood that the new zero pressure cross threshold may correspond to the offset pressure. For example, if the offset of the FTPT is determined to be 1 InH2O, then using the transfer function (Eq. 1) discussed above, the voltage at which the comparator circuit may latch may comprise 2.6404 Volts. In this way, the controller may be woken up in order to learn FTPT offset, even under conditions where there already is an offset determined. Comparator circuit may be used in conjunction with method 900, discussed in detail below, in order to conduct environmentally friendly FTPT offset diagnostics.

Accordingly, turning now to FIG. 9, an example method 900 for conducting an FTPT offset diagnostic is depicted. Specifically, method 900 may be used to determine FTPT offset, in response to a comparator circuit (e.g. 800) waking the controller (e.g. 212) to conduct the diagnostic when it is expected that pressure in the sealed fuel system will be at or near atmospheric pressure.

Method 900 will be described with reference to the systems described herein and shown in FIGS. 1-2 and FIG. 8, though it should be understood that similar methods may be applied to other systems without departing from the scope of this disclosure. Method 900 may be carried out by a controller, such as controller 212 in FIG. 2, and may be stored at the controller as executable instructions in non-transitory memory. Instructions for carrying out method 900 and the rest of the methods included herein may be executed by the controller based on instructions stored on a memory of the controller and in conjunction with signals received from sensors of the engine system, such as the sensors described above with reference to FIGS. 1-2 and FIG. 8. The controller may employ actuators such as FTIV (e.g. 252), etc., to alter states of devices in the physical world according to the method depicted below.

Method 900 begins at 905, and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 910, method 900 may include indicating whether a key-off event is indicated. In this example method, a key-off event may be understood to comprise a vehicle-off event, where the vehicle is deactivated. If a key-off event is not indicated, then method 900 may proceed to 912, where the vehicle may be operated according to driver demand. For example, the vehicle may be propelled via the engine, motor, or some combination of the two. Method 900 may then end.

Returning to 910, in response to a key-off event being indicated, method 900 may proceed to 915. At 915, method 900 may include latching the zero pressure threshold via the comparator circuit (e.g. 800). For example, if no offset of the FTPT has been previously indicated, then the zero pressure cross threshold may comprise 2.5 V, as per the transfer function discussed above at FIG. 7. Alternatively, if there is already an indication that the FTPT offset is 2 InH2O, for example, then the zero pressure cross threshold may comprise 2.7808 V, as per the transfer function discussed above at FIG. 7.

With the zero pressure cross threshold latched via the comparator circuit, at 915 the controller may be put to sleep where essential functions are maintained powered at a reduced level, and where non-essential functions are powered off. Power to the comparator circuit may be maintained.

Proceeding to 920, method 900 may include indicating whether a controller wakeup event is indicated. In other words, at 920, method 900 determines whether the comparator circuit has triggered the waking of the controller (e.g. 212). If not, method 900 may proceed to 925, where it is indicated as to whether a key-on event is indicated. For example, a vehicle operator may desire to travel via the vehicle, and thus may enter and activate the vehicle prior to the controller being woken to conduct the diagnostic for learning FTPT offset. In some examples, a key-on event may comprise a remote start event, for example. Accordingly, if a key-on event is indicated at 925, method 900 may proceed to 930, where the vehicle may be operated according to driver demand, as discussed above at 912. Method 900 may then end.

Returning to 925, if a key-on event is not indicated, method 900 may return to 920 where it is assessed as to whether the controller wake event has occurred. In response to the controller being triggered to wake at 920, method 900 may proceed to 935. At 935, method 900 may include commanding open the FTIV, and may further include allowing for system stabilization. Specifically, while the comparator circuit is designed for waking the controller and commanding the fuel system unsealed at a point where pressure in the fuel system is at atmospheric pressure, depending on any inherent FTPT offset, pressure in the fuel system may not be precisely at atmospheric pressure. In other words, there may be some amount of pressure or vacuum in the fuel system that gets relieved upon commanding open the FTIV.

With the fuel system commanded unsealed at 935, method 900 may proceed to 940. At 940, method 900 may include recording fuel system pressure via the FTPT (e.g. 291). In this way, at step 945, method 900 may include determining FTPT offset. For example, consider a situation where the comparator circuit was latched to wake the controller when pressure in the fuel system reads 0 InH2O. Accordingly, when the FTPT reads 0 InH2O, the controller may be woken, and the FTIV may be commanded open. However, when coupled to atmosphere, the FTPT may read 1 InH2O, for example. In this example, the offset of the FTPT would be determined at 945 to be 1 InH2O. Other examples are possible, such as when the fuel system is coupled to atmosphere, pressure as monitored via the FTPT may read −2 InH2O. In such an example, the offset of the FTPT would be determined at 945 to be −2 InH2O. However, while such methodology may not enable unsealing of the fuel system at precisely a time when pressure in the sealed fuel system is equal to atmospheric pressure, the methodology may reduce an overall amount of fuel vapors that may load the canister and/or may reduce induction of air into the fuel tank, as compared to a situation where such a wakeup circuit were not utilized. For example, unsealing the fuel system when pressure in the sealed fuel system is 1 InH2O will load the canister much less than a case where the fuel system is unsealed when pressure in the sealed fuel system is 30 InH2O or greater. Thus, by using the wakeup circuit as discussed, the unsealing of the fuel system may be conducted at times when it is likely or expected that pressure in the sealed fuel system will be near atmospheric pressure.

With the offset determined at 945, method 900 may proceed to 950. At 950, method 900 may include commanding closed the FTIV to once again seal the fuel system from atmosphere. Proceeding to 955, method 900 may include updating vehicle operating conditions. At 955, updating vehicle operating conditions may include updating the FTPT offset at the controller. For example, if the FTPT offset is 1 InH2O, then such an offset may be stored at the controller such that controller strategy may rely on the offset value. In one example, as discussed, the offset may be set as the zero pressure cross threshold for any subsequent times where the comparator circuit (see FIG. 8) is utilized to wake the controller in order to determine the FTPT offset. In another example, thresholds for a presence or absence of undesired evaporative emissions tests may be adjusted as a function of the offset value. For example, if the offset value is 10 InH2O, and the fuel system is considered to be free from a source of undesired evaporative emissions when the pressure is at or above 9 InH2O, then if not compensated for, the fuel system may be determined to be free from undesired evaporative emissions when in fact, the fuel system includes a source of undesired evaporative emissions. Thus, thresholds for indicating presence or absence of undesired evaporative emissions may be adjusted as a function of the determined offset of the FTPT. For detailed explanation of how thresholds may be adjusted for particular diagnostics for presence or absence of undesired evaporative emissions, refer to the description of FIG. 3, which similarly applies to the method of FIG. 9.

In some examples, the offset may be used to compensate fuel system depressurization determination. For example, in response to a request for refueling, the refueling lock (e.g. 245) may only unlock in response to pressure in the fuel system being within an absolute value threshold of atmospheric pressure. Thus, an FTPT that has an inherent offset that is outside the range of the absolute value threshold, may not enable unlocking of the refueling lock unless the refueling lock is manually unlocked. Thus, in some examples, the determined FTPT offset may be used to enable access to a fuel filler neck (or in other words, unlocking of the refueling lock), even under conditions where the FTPT does not indicate pressure in the fuel system within the range bounded by the absolute value thresholds of atmospheric pressure.

For example, in some cases, in response to an indication that the FTPT offset is such that the refueling lock may not open in response to fuel system depressurization, then the controller strategy may be updated to unlock the refueling lock in response to pressure in the fuel system being within a threshold (e.g. +/−5 InH2O) of the FTPT offset value. For example, if the FTPT offset is 10 InH2O, then control strategy may unlock the refueling lock in response to pressure in the fuel system being between 5 and 15 InH2O. In another example where the FTPT offset is such that control strategy may not unlock the refueling lock in response to fuel system depressurization, the controller strategy may be updated to enable the refueling lock unlocked regardless of the pressure reading in the fuel system once coupled to atmosphere for refueling. In some examples, control strategy may only be updated as discussed, in response to a predetermined threshold number of times the FTPT offset has been determined. For example, if an FTPT offset has been indicated three times or more, in other words three independent diagnostics that rely on the comparator circuit have indicated the FTPT offset, then control strategy may be modified to enable the refueling lock to be opened in response to fuel system depressurization as discussed above.

Proceeding to 960, method 900 may include once again sleeping the controller. Method 900 may then end.

Turning now to FIG. 10, an example timeline 1000 is shown, depicting how a wakeup circuit such as the wakeup circuit depicted at FIG. 8 may be used to wake a controller of a vehicle at a time when pressure in a sealed fuel system corresponds to a particular pressure that is latched via the wakeup circuit, such that a diagnostic for FTPT offset may be conducted. Timeline 1000 includes plot 1005, indicating controller status, over time. The controller may be either asleep, or awake, over time. Timeline 1000 further includes plot 1010, indicating pressure in the fuel system as monitored via an FTPT (e.g. 291), over time. There are various thresholds associated with plot 1010 which will be discussed in further detail below. Timeline 1000 further includes plot 1025, indicating whether the FTIV (e.g. 252) is open or closed, over time.

At time t0, the controller is asleep (plot 1005). The comparator circuit (e.g. 800) is powered, and the zero pressure cross threshold has been determined and corresponds to atmospheric pressure (0 InH2O). In other words, with the zero pressure cross threshold determined to be atmospheric pressure, this threshold has been converted to a voltage reading, and the voltage reading is thus latched via the latching chip (e.g. 845) of the comparator circuit. Thus, in this example timeline 1000, when the FTPT registers atmospheric pressure, the controller may be woken up in order to determine FTPT offset. Thus, the zero pressure cross threshold is represented by dashed line 1011. Furthermore, at time t0, the FTIV is closed, thus the fuel system is sealed from atmosphere.

At time t1, the controller is triggered to awake mode (plot 1005), as pressure as monitored via the FTPT reaches the zero pressure cross threshold represented by line dashed line 1011. Accordingly, with the controller triggered awake, at time t2 the FTIV is commanded open (plot 1025), to couple the fuel system to atmosphere. Just after the FTIV is commanded open, pressure in the fuel system rises slightly and stabilizes between time t2 and t3. The pressure that the FTPT rises to represents the FTPT offset. Specifically, arrow 1013 points to dashed line 1012, which comprises a new zero pressure cross threshold for the comparator circuit. In other words, because when the fuel system was coupled to atmosphere, pressure as monitored via the FTPT rose slightly above atmospheric pressure, this new value representing the offset becomes the new or second zero pressure cross threshold for the comparator circuit, such that subsequent FTPT offset diagnostics may be conducted using the second zero pressure cross threshold. The difference between atmospheric pressure and the new FTPT offset is represented by 1020.

At time t3, with the FTPT offset having been determined, the FTIV is commanded closed, and then the controller is put to sleep at time t4. Between time t4 and t5, pressure in the fuel system becomes negative with respect to atmospheric pressure. Thus, it may be understood that the vehicle is in a heat loss portion of the diurnal cycle.

Between time t5 and t6, some time passes. It may be understood that between time t5 and t6, the vehicle may be driven, but another FTPT offset diagnostic is not conducted. By time t6, the vehicle is returned to sleep mode, with the pressure as represented by dashed line 1012 used in conjunction with the transfer function discussed at FIG. 7, to latch a voltage reading corresponding to the pressure represented by dashed line 1012 via the latching chip of the comparator circuit, such that the controller may be woken up in response to pressure in the sealed fuel system reaching the pressure represented by dashed line 1012.

Between time t6 and t7, pressure in the sealed fuel system rises, thus it may be understood that the vehicle is in a heat gain portion of the diurnal cycle. At time t7, pressure in the sealed fuel system as monitored via the FTPT reaches the second zero pressure cross threshold, represented by dashed line 1012. Accordingly, the controller is woken up (plot 1005), and at time t8, the FTIV is commanded open. After commanding open the FTIV, the FTPT reading changes slightly, becoming slightly more positive than the second zero pressure cross threshold. Thus, the pressure that the FTPT registers between time t8 and t9 represents a further FTPT offset. Specifically, arrow 1017 points to dashed line 1016, which comprises another new or third zero pressure cross threshold for the comparator circuit. In other words, because when the fuel system was coupled to atmosphere at time t8, pressure as monitored via the FTPT rose slightly higher than the second zero pressure cross threshold, this new value becomes the third zero pressure threshold for the comparator circuit, such that subsequent FTPT offset diagnostics may be conducted using the third zero pressure cross threshold. The difference between the second zero pressure cross threshold 1012 and the third zero pressure cross threshold is represented by 1014. The difference between the third zero pressure cross threshold and atmospheric pressure is represented by 1015. Thus, in this example timeline, by time t9, FTPT offset has become the difference between the third zero pressure cross threshold 1016 and atmospheric pressure (also referred to in this example timeline as the zero pressure cross threshold 1011).

At time t9, the FTIV is commanded closed (plot 1025) thus sealing the fuel system from atmosphere. At time t10, the controller is once again slept, after having latched the third zero pressure cross threshold at the comparator circuit. Between time t10 and t11, pressure in the sealed fuel system continues to rise (plot 1010). Thus, it may be understood that the vehicle is in a heat gain portion of the diurnal cycle.

Returning to FIG. 9, it is herein recognized that in a situation where a vehicle-off condition lasts for a duration where it is expected that the pressure in the fuel system may transition from a positive pressure to a negative pressure, or vice versa, but where the controller was not woken up, it may be that the FTPT is stuck in range, and is not registering fuel system pressure changes. Whether or not a wakeup is expected may be based on knowledge of the diurnal cycle, for example the controller of the vehicle may communicate with one or more servers, the internet, etc., and/or may retrieve information from the onboard GPS, related to current and future weather conditions, time of day, etc. In this way, it may be determined if a wakeup of the controller is expected for a vehicle-off condition.

If the controller is not awoken a predetermined number of times where the controller is expected to have awoken if the FTPT were functioning as desired, then control strategy may request a diagnostic such as that discussed above at FIG. 3.

For example, in response to a request to refuel, if the fuel system does not depressurize to enable refueling, it may be likely that the FTPT is stuck in range. By conducting method 300 depicted at FIG. 3, the source of why the fuel system is not depressurizing (and by association, why the controller is not being woken up when otherwise expected to), may be determined.

Returning again to FIG. 9, it may be understood that in some examples, the controller may regularly be woken when expected to (e.g. when vehicle-off duration is sufficient for pressure in the sealed fuel system to transition from positive pressure to negative pressure, or vice versa), but no offset may be indicated. While such an indication may be due to the FTPT actually having no offset, such a result may alternatively be due to the FTIV not actually opening as desired and/or due to a presence of a restriction that does not enable the fuel system depressurized. Thus, similar to that discussed above, if a predetermined number (e.g. 3) of FTPT rationalization events that rely on waking the controller have occurred, without an offset being indicated, then control strategy may request the method of FIG. 3 be conducted. In other words, if no FTPT offset is being indicated because the FTIV is not opening or due to a restriction in one or more lines coupling the fuel system to atmosphere, then in response to a request for refueling, if the fuel system does not depressurize, a likely reason is that the FTIV is stuck closed and/or there are restrictions in the one or more lines. In this example, by conducting the method of FIG. 3, it may be conclusively determined as to whether there is no inherent offset of the FTPT or if the FTIV is stuck closed and/or that there are restriction(s) in the one or more lines coupling the fuel system to atmosphere.

In this way, inherent offset of an FTPT may be determined, such that routines that involve fuel system depressurization and/or tests for undesired evaporative emissions may be improved. For example, thresholds for tests for undesired evaporative emissions may be adjusted in response to learning FTPT offset, and in cases where FTPT offset is such that a refueling lock may not unlock in response to fuel system depressurization due to the offset, control strategy may be updated to enable the refueling lock unlocked without having to manually unlock the refueling lock. Furthermore, the systems and methods disclosed herein may enable a determination as to whether the FTPT is stuck in range and not responding to pressure changes in the fuel system, and/or whether the FTIV which seals the fuel system is stuck closed or if there is some restriction in one or more lines coupling the fuel system to atmosphere which may prevent depressurization.

A technical effect is to recognize that when a refueling lock is manually opened due to the refueling lock not being opened in response to fuel system depressurization, when a refueling dispenser is placed in a fuel filler neck, the fuel system is coupled to atmosphere via the fuel filler neck. Accordingly, such a situation enables a determination as to whether the FTPT degradation (e.g. offset, stuck in range) is the reason for the refueling lock not opening, or if the reason stems from blockage in one or more lines coupling the fuel system to atmosphere (not including the fuel filler neck). Thus, a technical effect is to recognize that, responsive to the refueling lock being manually opened, such a determination as discussed above may be made based on fuel system pressure and fuel system fuel level during an ensuing refueling event.

Another technical effect is to recognize that FTPT rationalization may be conducted at times when the sealed fuel system is expected to be at atmospheric pressure, which may thus enable rationalization without undesirably loading the fuel vapor storage canister with vapors, and/or without inducting air into the fuel system, which may disturb partial pressures, increase vaporization, and decrease volatility. Thus, a technical effect is to recognize that a wakeup circuit that relies on the FTPT may be utilized in order to wake a controller at precisely a time when fuel system pressure is expected to be at atmospheric pressure, in order to conduct the FTPT rationalization procedure.

The systems described herein, along with the methods described herein, may enable one or more systems and one or more methods. In one example, a method comprises in response to a refueling lock that enables access to a fuel tank of a fuel system being manually unlocked in order to add a fuel to the fuel tank, monitoring a pressure in the fuel system via a pressure sensor and a fuel level in the fuel tank during refueling the fuel tank; and indicating degradation of the fuel system as a function of both the pressure and the fuel level. In a first example of the method, the method further includes wherein the fuel system comprises a sealed fuel system and wherein the refueling lock being manually opened is in response to the pressure in the fuel system not becoming within a predetermined threshold of atmospheric pressure in response to a request to refuel the fuel tank, where the request includes unsealing the fuel system to couple the fuel system to atmosphere. A second example of the method optionally includes the first example, and further includes wherein indicating degradation includes indicating a blockage in one or more lines between the fuel system and atmosphere in response to an indication that the pressure in the fuel system decays to atmospheric pressure just prior to the fuel level increasing in the fuel tank. A third example of the method optionally includes any one or more or each of the first through second examples, and further includes wherein the blockage includes one of a valve positioned between the fuel system and a fuel vapor storage canister being stuck closed and/or a restriction in the one or more lines between the fuel system and atmosphere. A fourth example of the method optionally includes any one or more or each of the first through third examples, and further includes wherein the fuel level increasing includes one or more premature shutoffs of a refueling dispenser that is refueling the fuel tank during the refueling the fuel tank. A fifth example of the method optionally includes any one or more or each of the first through fourth examples, and further includes wherein indicating degradation includes indicating the pressure sensor is stuck and is not responding to pressure differences, in response to an indication that the pressure in the fuel system remains unchanged during the refueling event, while the fuel level in the fuel tank increases linearly during the refueling event. A sixth example of the method optionally includes any one or more or each of the first through fifth examples, and further includes wherein indicating degradation includes indicating an offset of the pressure sensor in response to the pressure increasing during the refueling event, and where the fuel level in the fuel tank increases linearly during the refueling event. A seventh example of the method optionally includes any one or more or each of the first through sixth examples, and further comprises adjusting a pressure threshold for a test for a presence or an absence of undesired evaporative emissions stemming from the fuel system, as a function of the offset of the pressure sensor. An eighth example of the method optionally includes any one or more or each of the first through seventh examples, and further comprises in response to the offset being indicated a predetermined number of times, enabling access to the fuel tank of the fuel system in response to a request to refuel the fuel tank, without the refueling lock having to be manually unlocked.

Another example of a method comprises in response to a request to refuel a fuel tank positioned in a fuel system of a vehicle, unsealing the fuel tank to couple the fuel tank to atmosphere; and responsive to a pressure in the fuel system not depressurizing to within a predetermined threshold of atmospheric pressure in response to the unsealing the fuel tank and further responsive to a refueling lock that provides access to the fuel tank being indicated to be manually unlocked, monitoring the pressure in the fuel system and a fuel level during refueling the fuel tank to indicate a source for the fuel system not depressurizing in response to the unsealing the fuel tank. In a first example of the method, the method further comprises indicating that the source comprises a restriction in one or more lines that couple the fuel system to atmosphere in response to the pressure in the fuel system becoming within the predetermined threshold of atmospheric pressure after the refueling lock has been manually unlocked and just prior to the fuel level in the fuel tank increasing. A second example of the method optionally includes the first example, and further includes wherein the fuel level increasing includes the fuel level increasing in a step-wise fashion. A third example of the method optionally includes any one or more or each of the first and second examples, and further includes wherein in response to the indication of the restriction in the one or more lines that couple the fuel system to atmosphere, taking mitigating action to operate the vehicle in a mode that does not rely on fuel in the fuel tank, in order to conserve fuel until the restriction is remedied. A fourth example of the method optionally includes any one or more or each of the first through third examples, and further includes wherein the pressure in the fuel system becomes within the predetermined threshold of atmospheric pressure due to a refueling nozzle being inserted into a fuel filler neck of the fuel tank, thereby coupling the fuel tank to atmosphere via a route that is different than via the one or more lines that couple the fuel system to atmosphere. A fifth example of the method optionally includes any one or more or each of the first through fourth examples, and further comprises in response to an indication that the fuel level in the fuel tank increases linearly during the refueling the fuel tank, indicating that the source for the fuel system not depressurizing includes a pressure sensor that is stuck in response to the pressure not changing during the refueling the fuel tank; and indicating that the source for the fuel system not depressurizing includes the pressure sensor with an inherent offset in response to the pressure increasing and stabilizing during the refueling event. A sixth example of the method optionally includes any one or more or each of the first through fifth examples, and further includes wherein the inherent offset of the pressure sensor comprises the pressure in the fuel system after the refueling lock being manually unlocked and prior to fuel being added to the fuel tank. A seventh example of the method optionally includes any one or more or each of the first through sixth examples, and further comprises adjusting a pressure threshold for indicating a presence or an absence of undesired evaporative emissions via a fuel system diagnostic as a function of the inherent offset. An eighth example of the method optionally includes any one or more or each of the first through seventh examples, and further comprises adjusting a depressurization threshold for indicating that the fuel system is depressurized as a function of the inherent offset.

An example of a system for a hybrid vehicle comprises a fuel system that includes a fuel tank selectively fluidically coupled to atmosphere via a fuel tank isolation valve, a fuel level indicator, and a fuel tank pressure transducer; a refueling request button; a refueling lock, and a manual refueling lock button; and a controller with computer readable instructions stored on non-transitory memory that when executed cause the controller to: receive a request to refuel the fuel tank in response to the refueling request button being depressed; command the fuel tank fluidically coupled to atmosphere; monitor a pressure in the fuel system via the fuel tank pressure transducer; and in response to the pressure in the fuel system not becoming within a predetermined threshold of atmospheric pressure and further responsive to the controller receiving a request to unlock the refueling lock based on a depression of the manual refueling lock button; monitoring both the pressure in the fuel system and a fuel level in the fuel tank subsequent to the refueling lock being unlocked, to indicate whether the fuel tank isolation valve is stuck closed or whether the fuel tank pressure transducer is degraded. In a first example of the system, the system may further include wherein the controller stores further instructions to: indicate that the fuel tank isolation valve is stuck closed but that the fuel tank pressure transducer is functioning as expected in response to the pressure in the fuel system decaying to atmosphere after the refueling lock is unlocked but before fuel is indicated as being added to the tank, and where one or more premature shutoffs of a refueling dispenser that adds fuel to the fuel tank are indicated; and indicate the fuel tank isolation valve is functioning as desired in response to the fuel level in the fuel tank increasing linearly after the refueling lock is unlocked, but that the fuel tank pressure transducer is degraded, wherein indicating degradation of the fuel tank pressure transducer includes indicating the fuel tank pressure transducer is stuck in response to the pressure not changing as fuel is added to the tank, or wherein indicating degradation of the fuel tank pressure transducer includes indicating the fuel tank pressure transducer has an inherent offset in response to the pressure increasing and then stabilizing as fuel is added to the fuel tank.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
in response to a request to refuel a fuel tank positioned in a fuel system of a vehicle, unsealing the fuel tank to couple the fuel tank to atmosphere;
responsive to pressure readings of a pressure sensor in the fuel system not decreasing to within a predetermined threshold of atmospheric pressure in response to the unsealing the fuel tank and further responsive to a refueling lock that controls access to the fuel tank being indicated to be manually unlocked, monitoring a pressure in the fuel system with the pressure sensor and a fuel level during refueling the fuel tank with a fuel level sensor; and
indicating a source for the fuel system not depressurizing in response to the unsealing the fuel tank based on the monitored pressure with the pressure sensor and the monitored fuel level with the fuel level sensor, wherein indicating the source includes differentiating between whether the monitored pressure becomes within the predetermined threshold of atmospheric pressure just prior to the monitored fuel level in the fuel tank increasing, a premature shutoff occurring, and the monitored fuel level increasing during refueling the fuel tank.

2. The method of claim 1, further comprising:
indicating that the source comprises a restriction in one or more lines that couple the fuel system to atmosphere in response to the monitored pressure in the fuel system becoming within the predetermined threshold of atmospheric pressure after the refueling lock has been manually unlocked and just prior to the monitored fuel level in the fuel tank increasing.

3. The method of claim 2, wherein the monitored fuel level increasing includes the fuel level increasing in a step-wise fashion, and wherein the indicating of the source is further responsive to premature shutoff events not occurring during the refueling.

4. The method of claim 3, wherein the monitored pressure in the fuel system becomes within the predetermined threshold of atmospheric pressure due to a refueling nozzle being inserted into a fuel filler neck of the fuel tank, thereby coupling the fuel tank to atmosphere via a route that is different than via the one or more lines that couple the fuel system to atmosphere.

5. The method of claim 2, wherein in response to the indication of the restriction in the one or more lines that couple the fuel system to atmosphere, taking mitigating action to operate the vehicle in a mode that does not rely on fuel in the fuel tank, in order to conserve fuel until the restriction is remedied.

6. The method of claim 2, further comprising:
in response to an indication that the monitored fuel level in the fuel tank increases linearly during the refueling the fuel tank:
indicating that the source for the fuel system not depressurizing includes a pressure sensor that is stuck in response to pressure readings of the pressure sensor not changing during the refueling the fuel tank; and
indicating that the source for the fuel system not depressurizing includes the pressure sensor with an inherent offset in response to the pressure readings of the pressure sensor increasing and stabilizing during a refueling event.

7. The method of claim 6, wherein the inherent offset of the pressure sensor is the pressure in the fuel system after the refueling lock being manually unlocked and prior to fuel being added to the fuel tank.

8. The method of claim 6, further comprising:
adjusting a pressure threshold for indicating a presence or an absence of evaporative emissions via a fuel system diagnostic as a function of the inherent offset.

9. The method of claim 6, further comprising:
adjusting a depressurization threshold for indicating that the fuel system is depressurized as a function of the inherent offset.

* * * * *